United States Patent
Iijima et al.

(10) Patent No.: US 9,714,354 B2
(45) Date of Patent: Jul. 25, 2017

(54) ACTIVE RAY-CURABLE INKJET INK AND IMAGE FORMING METHOD USING SAME

(71) Applicant: Konica Minolta, Inc., Tokyo (JP)

(72) Inventors: Hirotaka Iijima, Tokyo (JP); Toshiyuki Takabayashi, Tokyo (JP); Akio Maeda, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 90 days.

(21) Appl. No.: 14/396,426

(22) PCT Filed: Apr. 23, 2013

(86) PCT No.: PCT/JP2013/002719
§ 371 (c)(1),
(2) Date: Oct. 23, 2014

(87) PCT Pub. No.: WO2013/161270
PCT Pub. Date: Oct. 31, 2013

(65) Prior Publication Data
US 2015/0138289 A1  May 21, 2015

(30) Foreign Application Priority Data
Apr. 24, 2012 (JP) .................................. 2012-098811

(51) Int. Cl.
*C09D 11/30* (2014.01)
*B41J 11/00* (2006.01)
(Continued)

(52) U.S. Cl.
CPC ............. *C09D 11/30* (2013.01); *B41J 11/002* (2013.01); *C09D 11/101* (2013.01);
(Continued)

(58) Field of Classification Search
CPC ...................................................... C09D 11/30
See application file for complete search history.

(56) References Cited

U.S. PATENT DOCUMENTS 6,000,793 A * 12/1999 Inamoto ......................... 347/101
2007/0058020 A1 3/2007 Wetjens et al.
(Continued)

FOREIGN PATENT DOCUMENTS

JP 2007-297625 A 11/2007
JP 2010-208343 A 9/2010
(Continued)

OTHER PUBLICATIONS

Notice of Reasons for Rejection dated Sep. 20, 2016 from corresponding Japanese application; Patent Application No. 2014-512352; English translation of Notice of Reasons for Rejection; Total of 7 pages.

*Primary Examiner* — Manish S Shah
*Assistant Examiner* — Jeffrey C Morgan
(74) *Attorney, Agent, or Firm* — Lucas & Mercanti, LLP

(57) ABSTRACT

An active ray-curable inkjet ink which contains a photocurable compound, a photopolymerization initiator, a gelling agent and a non-polymerizable liquid compound that is in a liquid state at 25° C., with the liquid compound being contained in an amount of 15-50% by mass relative to the mass of the ink. Since droplets of this active ray-curable inkjet ink are prevented from combining with each other after landing, this active ray-curable inkjet ink is capable of providing high quality images. Meanwhile, the surface gloss of printed images is increased, and printed images having less coating film thickness difference (namely, less relief-like texture) can be formed.

19 Claims, 2 Drawing Sheets

(51) Int. Cl.
*C09D 11/101* (2014.01)
*C09D 11/322* (2014.01)
*C09D 133/10* (2006.01)
*C09D 11/38* (2014.01)

(52) U.S. Cl.
CPC ............ *C09D 11/322* (2013.01); *C09D 11/38* (2013.01); *C09D 133/10* (2013.01)

(56) References Cited

U.S. PATENT DOCUMENTS

| | | |
|---|---|---|
| 2007/0254978 A1 | 11/2007 | Odell et al. |
| 2009/0059138 A1* | 3/2009 | Matsumoto ............ B82Y 30/00 349/106 |
| 2013/0044168 A1 | 2/2013 | Kaga et al. |

FOREIGN PATENT DOCUMENTS

| | | |
|---|---|---|
| JP | 2011-057900 A | 3/2011 |
| WO | WO2007/025893 A1 | 3/2007 |
| WO | WO2011/065095 A1 | 6/2011 |

\* cited by examiner

ACTIVE RAY-CURABLE INKJET INK AND IMAGE FORMING METHOD USING SAME

CROSS REFERENCE TO RELATED APPLICATION

This application is a 371 of PCT/JP2013/002719 filed on Apr. 23, 2013 which, in turn, claimed the priority of Japanese Patent Application No. JP2012-098811 filed on Apr. 24, 2012, both applications are incorporated herein by reference.

TECHNICAL FIELD

The present invention relates to an actinic radiation-curable inkjet ink and an image forming method using the same.

BACKGROUND ART

Inkjet recording methods enable simple and inexpensive image production and therefore been used in a variety of printing fields. Among the inkjet recording methods, UV-curable inkjet method is known wherein droplets of inkjet ink are landed on a recording medium and then cured by irradiation with ultraviolet rays to form an image. Recently, the UV-curable inkjet method has been attracting attention for its capability of forming images having high rubfastness and adhesion even on recording media which lack ink absorbing properties.

However, image forming methods using the conventional UV-curable inkjet systems have the drawback of poor image quality due to failure to prevent combining of neighboring dots during high-speed recording such as single pass recoding using a line recording head or high speed serial recording. One of methods for preventing combining of neighboring dots is to add a gelling agent to an UV-curable inkjet ink. Stearone has been proposed as a gelling agent to be added to the ink (see, for example, PTL 1 and PTL 2).

CITATION LIST

Patent Literature

PTL 1
U.S. Patent Application Publication No. 2007/0058020
PTL 2
International Publication No. WO 2007/025893

SUMMARY OF INVENTION

Technical Problem

The inkjet ink containing the gelling agent described in PTL 1 or PTL 2 undergoes gelation quickly after the ink is landed on a recording medium, and can therefore prevent combining of neighboring droplets. On the other hand, the gelled inkjet ink is highly viscous and is thus difficult to level. Therefore, such a gelled inject ink tends to produce fine irregularities on the surface of a printed image and to impart insufficient glossiness to the printed image. In the case where the density of a printed image is adjusted by the amount of ink droplets, a film tends to have a large thickness at a site with a high density and to have a small thickness at a site with a low density. More specifically, level differences are likely to occur at the boundary between regions differing in density or at the boundary between an image-formed area and a non-image-formed area.

The present invention was made in view of the circumstances described above, and it is an object of the present invention to provide an actinic radiation-curable inkjet ink capable of forming a printed image that is excellent in glossiness and has small level differences (so-called relief feeling) in film thickness, and to provide an image forming method using the same.

Solution to Problem

A first aspect of the present invention relates to an actinic radiation-curable inkjet ink given below.

[1] An actinic radiation-curable inkjet ink including a photocurable compound, a photopolymerization initiator, a gelling agent, and a liquid compound that is a liquid at 25° C. and is non-polymerizable, in which the liquid compound is contained at from 15 wt % to 50 wt % relative to the weight of the ink.

[2] The actinic radiation-curable inkjet ink according to [1], in which the liquid compound has an SP value of 8.5 or more and less than 10.0 and has a boiling point of 120° C. or higher and lower than 200° C.

[3] The actinic radiation-curable inkjet ink according to [1], in which the photocurable compound includes a (meth) acrylate compound having a C Log P value in a range from 4.0 to 7.0.

A second aspect of the present invention relates to an image forming method given below.

[4] An image forming method including: attaching ink droplets of the actinic radiation-curable inkjet ink according to [1] to a recording medium by discharging the ink droplets from an inkjet recording head; and curing the droplets landed on the recording medium by irradiating the droplets with actinic radiation, in which the recording medium is heated before the irradiation with actinic radiation and/or after the irradiation with actinic radiation.

[5] The image forming method according to [4], in which the recording medium is heated before the irradiation with actinic radiation and after the irradiation with actinic radiation, in which a temperature of the recording medium after the irradiation with actinic radiation is higher than that of the recording medium before the irradiation with actinic radiation.

Advantageous Effects of Invention

The actinic radiation-curable inkjet ink according to one aspect of the present invention prevents combining of ink droplets after landing and therefore produces a high-quality image. Meanwhile, the surface glossiness of the printed image is enhanced. Furthermore, a relief feeling is also prevented.

DESCRIPTION OF EMBODIMENTS

Figure 1A:
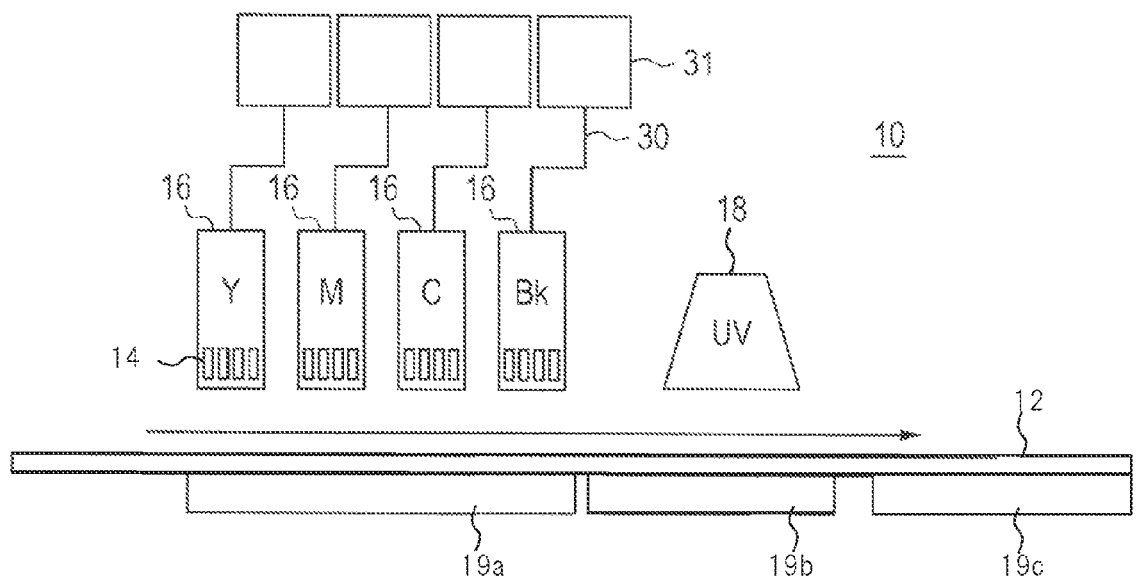
FIG. 1A illustrates one example of the configuration of a main part of inkjet recording apparatus of line recording type (side view)

According to one aspect, the present invention provides an actinic radiation-curable inkjet ink and a method for forming an image by applying this ink.

1. Actinic Radiation-Curable Inkjet Ink

The actinic radiation-curable inkjet ink according to one aspect of the present invention contains a photocurable compound, a liquid compound, a gelling agent, and a photopolymerization initiator. If necessary, the actinic radiation-curable inkjet ink further contains a colorant and additional additives.

(Photocurable Compound)

The photocurable compound is defined as a compound which undergoes crosslinking or polymerization by irradiation with actinic radiation. Examples of actinic radiation include electron beams, ultraviolet rays, α rays, γ rays, and X rays, among which ultraviolet rays are preferable. The photocurable compound may be a radical polymerizable compound or a cationic polymerizable compound, among which a radical polymerizable compound is preferably used.

The radical polymerizable compound is defined as a compound (monomer, oligomer, polymer or mixture thereof) which has a radically polymerizable ethylenically unsaturated bond. In an actinic radiation-curable inkjet ink, either single or two or more types of the radical polymerizable compound may be contained.

Examples of the compound having a radically polymerizable ethylenically unsaturated bond include an unsaturated carboxylic acid and a salt thereof, an unsaturated carboxylic ester compound, an unsaturated carboxylic urethane compound, an unsaturated carboxylic amide compound and an anhydride thereof, acrylonitrile, styrene, unsaturated polyester, unsaturated polyether, unsaturated polyamide, and unsaturated urethane. Examples of the unsaturated carboxylic acid include (meth)acrylic acid, itaconic acid, crotonic acid, isocrotonic acid, and maleic acid.

Among the foregoing, the radical polymerizable compound is preferably an unsaturated carboxylic ester compound and more preferably a (meth)acrylate compound. In addition to a monomer, the (meth)acrylate compound may be an oligomer, a mixture of a monomer and an oligomer, a modified product, or an oligomer having a polymerizable functional group. The term "(meth)acrylate" refers to both or one of "acrylate" and "methacrylate" and the term "(meth) acryl" refers to both or one of "acryl" and "methacryl".

The actinic radiation-curable inkjet ink according to one aspect of the present invention preferably contains a (meth) acrylate compound having a C Log P value in a range from 4.0 to 7.0 (hereinafter, also referred to as a "(meth)acrylate compound A") as the photocurable compound. When the (meth)acrylate compound A having a C Log P value in a range from 4.0 to 7.0 is contained therein, the solubility of the gelling agent in the ink in a sol state becomes satisfactory and discharge stability of the ink from an inkjet recording head becomes satisfactory. If the C Log P value of the (meth)acrylate compound A is lower than 4.0, the actinic radiation-curable inkjet ink becomes hydrophilic, and thus it is difficult for the gelling agent to be dissolved. Therefore, there might be a case in which the gelling agent is not fully dissolved even by heating, and thus the ink insufficiently undergoes sol-gel phase transition. Moreover, the poor discharge of the ink from the inkjet recording head is likely to occur. On the other hand, if the C Log P value of the (meth)acrylate compound A exceeds 7.0, the solubility of the photopolymerization initiator in the ink may be lowered so that the curability of the ink and/or ability of ink discharge from the inkjet recording head may be lowered. The C Log P value of the (meth)acrylate compound A is more preferably in a range from 4.5 to 6.0.

As used herein, the term "Log P value" is a coefficient indicating the affinity of an organic compound to water and 1-octanol. The 1-octanol/water partition coefficient P is a partition equilibrium achieved when a trace amount of a compound is dissolved as a solute in a two-liquid phase solvent of 1-octanol and water, and the partition coefficient P is the ratio of equilibrium concentrations of the compound in the respective solvents, and is expressed as Log P, the logarithm to the base 10 of the partition coefficient. That is, the "Log P value" is a logarithmic value of the partition coefficient of 1-octanol/water, and is known as an important parameter indicating the hydrophilicity and hydrophobicity of a molecule.

"C Log P value" is a Log P value found by calculation. The C Log P value can be calculated by the fragment method, atomic approach method or the like. More specifically, in order to calculate the C Log P value, the fragment method described in the literature (C. Hansch and A. Leo, "Substituent Constants for Correlation Analysis in Chemistry and Biology" (John Wiley & Sons, New York, 1969)), or commercially available software package 1 or 2 described below may be used.

Software package 1: MedChem Software (Release 3.54, August 1991, Medicinal Chemistry Project, Pomona College, Claremont, Calif.)

Software package 2: ChemDraw Ultra Ver. 8.0. (April 2003, CambridgeSoft Corporation, USA)

The numerical value of the C Log P value as used herein is a "C Log P value" calculated using software package 2.

The molecular weight of the (meth)acrylate compound A is preferably in a range from 300 to 1,500, and more preferably in a range from 300 to 800. For stable discharge of ink droplets from the inkjet recording head, it is required to set ink viscosity at a discharge temperature to be from 7 to 14 mPa·s. If an ink composition contains a (meth)acrylate compound A having a molecular weight of lower than 300 and a gelling agent, the ink shows a large viscosity change near the discharge temperature. Therefore, it is difficult to adjust the ink viscosity to fall within the range described above. In addition, since the (meth)acrylate compound A having a molecular weight of 300 or higher has a small odor, the odor of the actinic radiation-curable inkjet ink or a cured product thereof can be reduced. On the other hand, when the molecular weight of the (meth)acrylate compound A exceeds 1,500, the sol viscosity of the ink becomes excessively high.

The amount of the (meth)acrylate compound A contained in the actinic radiation-curable inkjet ink is preferably in a range from 5 to 30 wt %. If the amount of the (meth)acrylate compound A having a C Log P value in a range from 4.0 to 7.0 is less than 5 wt %, the ink becomes hydrophilic, and thus it is likely that the solubility of the gelling agent is lowered and discharge stability from the inkjet recording head is lowered. On the other hand, if the amount of the (meth)acrylate compound A exceeds 30 wt %, the solubility of the photopolymerization initiator in the ink is likely to be insufficient. Therefore, curability is likely to be insufficient.

More preferred examples of the (meth)acrylate compound A having a C Log P value in a range from 4.0 to 7.0 include (1) a methacrylate or acrylate compound with a functionality of 3 or more and having 3 to 14 structures each represented by ($—C(CH_3)H—CH_2—O—$) in the molecule, and (2) a methacrylate or acrylate compound with a functionality of 2 or more and having a cyclic structure in the molecule. These (meth)acrylate compounds A have high photocurability and reduced shrinkage when cured. These compounds further have high reproducibility of sol-gel phase transition.

Examples of (1) the methacrylate or acrylate compound with a functionality of 3 or more and having 3 to 14 structures each represented by ($—C(CH_3)H—CH_2—O—$)

in the molecule include a compound obtained by modifying a hydroxyl group of a compound having three or more hydroxyl groups with propylene oxide and esterifying the obtained modified product with (meth)acrylic acid. Specific examples of the compound include:

3PO modified trimethylolpropane triacrylate Photomer 4072 (molecular weight: 471, C Log P: 4.90, manufactured by Cognis); and 3PO modified trimethylolpropane triacrylate Miramer M360 (molecular weight: 471, C Log P: 4.90, manufactured by Miwon).

Examples of (2) the bifunctional or higher-functional methacrylate or acrylate compound having a cyclic structure in the molecule include a compound obtained by esterifying a hydroxyl group of a compound having two or more hydroxyl groups and tricycloalkane with (meth)acrylic acid. Specific examples of the compound include:

Tricyclodecane dimethanol diacrylate NK ESTER A-DCP (molecular weight: 304, C Log P: 4.69); and Tricyclodecane dimethanol dimethacrylate NK ESTER DCP (molecular weight: 332, C Log P: 5.12).

Another specific example of the (meth)acrylate compound A includes 1,10-decanediol dimethacrylate NK ESTER DOD-N (molecular weight: 310, C Log P: 5.75, manufactured by Shin-Nakamura Chemical Co., Ltd.).

Preferably, a (meth)acrylate compound having a molecular weight in a range from 300 to 1,500 and containing 3 or more and less than 14, and preferably 4 or more and less than 10 structures each represented by ($-CH_2-CH_2-O-$) in the molecule (hereinafter, also referred to as a "(meth) acrylate compound B") is also contained as another photocurable compound.

When the (meth)acrylate compound B having relatively high hydrophilicity and the (meth)acrylate compound A having relatively high hydrophobicity are contained with a gelling agent, which has a hydrophobic part and a hydrophilic part, the gelling agent can exist uniformly and stably in the ink in a sol state. Therefore, the actinic radiation-curable inkjet ink can be stably discharged from the inkjet recording head. When the (meth)acrylate compound B is contained, the sol-gel phase transition of the ink tends to occur quickly so that combining of ink droplets can be prevented.

When the (meth)acrylate compound B having 3 or more structures each represented by ($-CH_2-CH_2-O-$) is contained, the flexibility of a cured product of the actinic radiation-curable inkjet ink is enhanced. On the other hand, when the number of the structures each represented by ($-CH_2-CH_2-O-$) contained in the (meth)acrylate compound B is 14 or more, the hydrophilicity of the (meth) acrylate compound B becomes excessively high, and thus it is possible that the gelling agent is not fully dissolved in the actinic radiation-curable inkjet ink.

The C Log P value of the (meth)acrylate compound B containing the structures each represented by ($-CH_2-CH_2-O-$) in the molecule is preferably lower than 4.0, and more preferably 0.1 or higher and lower than 4.0. If the C Log P value of the (meth)acrylate compound B is excessively low, the hydrophilicity of the ink is increased so that the compatibility between the (meth)acrylate compound B and the gelling agent is lowered and thus the ink becomes unstable.

The molecular weight of the (meth)acrylate compound B is in a range from 300 to 1,500, and preferably in a range from 300 to 800. If the molecular weight is 300 or higher, it is difficult for the (meth)acrylate compound B to volatize in the inkjet recording apparatus and thus the discharge stability of the ink becomes satisfactory. On the other hand, if the molecular weight exceeds 1,500, the viscosity of the ink in a sol state is likely to be excessively high.

The (meth)acrylate compound B is (meth)acrylic acid ester and has a repeat unit ($-CH_2-CH_2-O-$) of ethylene glycol in the ester moiety. The (meth)acrylate compound A preferably has two or more (meth)acrylic groups, and preferably has two, three, or four (meth)acrylic groups.

Specific examples of the (meth)acrylate compound B include 4EO modified hexanediol diacrylate (CD561, manufactured by Sartomer Company, Inc., molecular weight: 358), 3EO modified trimethylolpropane triacrylate (SR454, manufactured by Sartomer Company, Inc., molecular weight: 429), 4EO modified pentaerythritol tetraacrylate (SR494, manufactured by Sartomer Company, Inc., molecular weight: 528), 6EO modified trimethylolpropane triacrylate (SR499, manufactured by Sartomer Company, Inc., molecular weight: 560), polyethylene glycol diacrylate (NK ESTER A-400, manufactured by Shin-Nakamura Chemical Co., Ltd., molecular weight: 508), (NK ESTER A-600, manufactured by Shin-Nakamura Chemical Co., Ltd., molecular weight: 708), polyethylene glycol dimethacrylate (NK ESTER 9G, manufactured by Shin-Nakamura Chemical Co., Ltd., molecular weight: 536), and tetraethylene glycol diacrylate (V#335HP, manufactured by OSAKA ORGANIC CHEMICAL INDUSTRY LTD., molecular weight: 302).

The content of the (meth)acrylate compound B is preferably from 12 to 50 wt %, and more preferably from 15 to 40 wt % relative to the total weight of the actinic radiation-curable inkjet ink. If the amount of the (meth)acrylate compound B exceeds 50 wt %, the hydrophilicity of the ink is increased so that the solubility of the gelling agent is lowered and thus the stability of gelation is lowered. On the other hand, if the amount of the (meth)acrylate compound B is smaller than 12 wt %, the flexibility of a cured product of the ink is lowered. Accordingly, there might be a case in which the image film is torn when the image is bent.

The photocurable compound may further contain photocurable compounds other than the (meth)acrylate compound A and the (meth)acrylate compound B. Examples of other photocurable compounds may include a (meth)acrylate monomer and/or oligomer, and other polymerizable oligomers.

Examples of the (meth)acrylate monomer and/or oligomer include monofunctional monomers such as isoamyl acrylate, stearyl acrylate, lauryl acrylate, octyl acrylate, decyl acrylate, isomyristyl acrylate, isostearyl acrylate, 2-ethylhexyl-diglycol acrylate, 2-hydroxybutyl acrylate, 2-acryloyloxy ethyl hexahydrophthalate, butoxyethyl acrylate, ethoxy diethylene glycol acrylate, methoxy diethylene glycol acrylate, methoxy polyethylene glycol acrylate, methoxy propylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, 2-acryloyloxy ethyl succinate, 2-acryloyloxy ethyl phthalate, 2-acryloyloxyethyl-2-hydroxyethyl-phthalate, lactone modified flexible acrylate, and t-butylcyclohexyl acrylate; bifunctional monomers such as triethylene glycol diacrylate, tetraethylene glycol diacrylate, polyethylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, diacrylate of a PO adduct of bisphenol A, hydroxy pivalic acid neopentyl glycol diacrylate, and polytetramethylene glycol diacrylate; trifunctional or higher functional monomers such as trimethylolpropane triacrylate, pentaerythritol triacrylate, pentaerythritol tetraacrylate, dipentaerythritol hexaacrylate, ditrimethylolpropane tetraacrylate, glycerin propoxy triacrylate, caprolactone modified trimethylolpropane triacrylate, pentaerythritol ethoxy tetraacrylate, and caprolactam modified dipentaerythritol hexaacrylate; and oligomers thereof.

Examples of additional polymerizable oligomers include epoxy acrylate, aliphatic urethane acrylate, aromatic urethane acrylate, polyester acrylate, and straight-chain acrylic oligomers.

(Liquid Compound)

The actinic radiation-curable inkjet ink according to one aspect of the present invention contains a liquid compound. The liquid compound is defined as a compound that is a liquid at 25° C. and is non-polymerizable. The term "non-polymerizable" compound as used herein is defined as a compound "lacking any group which is active against actinic radiation".

The conventional ink that undergoes sol-gel phase transition quickly undergoes gelation after the ink is landed on a recording medium and thus the viscosity is increased. Therefore, combining of ink droplets is prevented. Accordingly, a high-quality image is obtained. On the other hand, ink droplets landed on the recording medium are difficult to level, and therefore tend to produce fine irregularities on the surface of a printed image and to impart insufficient glossiness to the surface. Furthermore, the amount of the ink tends to be large, i.e., a film tends to have a large thickness, in a region with a high image density, while the amount of the ink tends to be small, i.e., a film tends to have a small thickness, in a region with a low image density. Thus, level differences (so-called relief feeling) are likely to occur at the boundary between regions differing in image density.

In contrast to this, since the actinic radiation-curable inkjet ink according to one aspect of the present invention contains a liquid compound, a printed image that is excellent in glossiness and has high smoothness is obtained. This is achieved by the following mechanism.

The liquid compound is inactive against actinic radiation. For this reason, the liquid compound exists as a liquid in an ink film after irradiation with actinic radiation. This liquid compound volatizes from the surface of the ink film or penetrates into the recording medium, whereby the thickness of the film is gradually decreased. As the thickness is decreased, irregularities or level differences in the surface of the film are reduced. More specifically, the smoothness of a printed image to be finally obtained is enhanced, and the surface glossiness is also enhanced.

When the actinic radiation-curable inkjet ink contains the liquid compound, ink components easily enter the recording medium, together with the liquid compound. Also, the adhesion between the recording medium and the printed image is enhanced.

The SP value of the liquid compound, which is a parameter of solubility, is preferably 8.5 or more and less than 10.0. If the SP value of the liquid compound is less than 8.5, the difference of this SP value from the SP value of the gelling agent described below is small, so that the compatibility between the gelling agent and the liquid compound is easily increased. When the compatibility between the gelling agent and the liquid compound is high, it is difficult for the gelling agent to be precipitated after landed on a recording medium. Accordingly, pinning of ink droplets is likely to be insufficient. On the other hand, if the SP value of the liquid compound is 10 or more, the difference of this SP value from the SP value of a general recording medium tends to be large. Thus, it is difficult for the liquid compound to penetrate into the recording medium. Accordingly, the adhesion between a cured product of the ink and the recording medium is likely to be lowered.

The SP value of a liquid composition defined herein refers to a numerical value that is determined by the calculation Fedor's method. The Fedor's method for SP value calculation is described in R. F. Fedor; Polymer Engineering Science, 14 (2), 147-154 (1974).

The boiling point of the liquid compound is preferably from 120° C. or higher and lower than 200° C. If the boiling point of the liquid compound is lower than 120° C., the liquid compound easily volatizes in the inkjet recording apparatus and thus the discharge stability of the ink is likely to be lowered. On the other hand, if the boiling point of the liquid compound exceeds 200° C., it is difficult for the liquid compound to volatize from a cured film of the ink. More specifically, the thickness of the ink film is less likely to be decreased and thus irregularities or level differences in the surface of the printed image are less likely to be reduced. Therefore, glossiness is not sufficient, and a relief feeling is less likely to be reduced. In addition, liquid components are likely to remain in the printed image and thus the film curability of the printed image is likely to be insufficient.

The type of the liquid compound is not particularly limited. Examples of the liquid compound include:

hydrocarbon compounds;

aromatic compounds such as anisole (boiling point: 153° C., SP value: 9.4);

ketone compounds such as isophorone (boiling point: 218° C., SP value: 9.8);

lower alcohols such as n-propyl alcohol (boiling point: 97° C., SP value: 11.84);

higher alcohols;

glycols such as 1,3-butylene glycol (boiling point: 208° C., SP value: 13.78);

glycol ethers such as propylene glycol monomethyl ether (boiling point: 121° C., SP value: 10.19), diethylene glycol monomethyl ether (boiling point: 202° C., SP value: 10.94), propylene glycol n-propyl ether (boiling point: 150° C., SP value: 9.82), propylene glycol butyl ether (boiling point: 170° C., SP value: 9.69), dipropylene glycol monomethyl ether (boiling point: 190° C., SP value: 9.69), dipropylene glycol n-propyl ether (boiling point: 212° C., SP value: 9.5), dipropylene glycol butyl ether (boiling point: 229, SP value: 9.43), dipropylene glycol dimethyl ether (boiling point: 175° C., SP value: 7.88), dipropylene glycol methyl propyl ether (boiling point: 203° C., SP value: 7.99), tripropylene glycol monomethyl ether (boiling point: 242° C., SP value: 9.43), and tripropylene glycol butyl ether (boiling point: 274° C., SP value: 9.27);

esters such as methyl acetate (boiling point: 56° C., SP value: 8.78), ethyl acetate (boiling point: 77° C., SP value: 8.74), isopropyl ether acetate (boiling point: 85° C., SP value: 8.5), butyl acetate (boiling point: 126° C., SP value: 8.7), n-propyl acetate (boiling point: 102° C., SP value: 8.72), 3-methoxybutyl acetate (boiling point: 171° C., SP value: 8.71), 1,3-butylene glycol diacetate (boiling point: 232° C., SP value: 9.51), 1,4-butanediol diacetate (boiling point: 220° C., SP value: 9.64), 1,6-hexanediol diacetate (boiling point: 260° C., SP value: 9.48), and cyclohexanol acetate (boiling point: 173° C., SP value: 9.18); and glycol ether acetates such as ethylene glycol monomethyl ether acetate (boiling point: 145° C., SP value: 8.96), ethylene glycol monobutyl ether acetate (boiling point: 188° C., SP value: 8.85), diethylene glycol monomethyl ether acetate (boiling point: 217° C., SP value: 9.01), diethylene glycol monobutyl ether acetate (boiling point: 247° C., SP value: 8.94), propylene glycol monomethyl ether acetate (boiling point: 146° C., SP value: 8.73), propylene glycol diacetate (boiling point: 190° C., SP value: 9.6), and dipropylene glycol methyl ether acetate (boiling point: 213° C., SP value: 8.71).

The content of the liquid compound is from 15 to 50 wt %, and preferably from 25 to 40 wt % relative to the total weight of the actinic radiation-curable ink. If the content of the liquid compound is smaller than 15 wt %, the amount of the liquid compound volatizing from the film of the ink landed on a recording medium or penetrating into the recording medium is small and thus the thickness of the film is less likely to be decreased. Therefore, the surface of the printed image is less likely to be smoothed. Furthermore, the adhesion-improving effect is difficult to obtain. On the other hand, if the amount of the liquid compound exceeds 50 wt %, the amount of the photocurable compound is relatively decreased. Therefore, the curability of the film is likely to be lowered, and the sharpness of letters or an image might be lowered. Due to such a small amount of the photocurable compound, the film strength or the like of a cured film of the ink is likely to be lowered.

(Gelling Agent)

The actinic radiation-curable inkjet ink contains a gelling agent. The gelling agent has a function of causing the inkjet ink to undergo temperature-induced reversible sol-gel phase transition. Such a gelling agent is required to satisfy at least the followings requirements: 1) the gelling agent is dissolved in a photocurable compound or a non-polymerizable resin at a temperature higher than the gelation temperature; and 2) the gelling agent is crystallized in the ink at a temperature lower than the gelation temperature.

When the gelling agent is crystallized in an ink, it is preferable that a space three-dimensionally surrounded by plate-like crystals, a crystallization product of the gelling agent, be formed so that the photocurable compound is included in that space. A structure in which a photocurable compound is included in a space three-dimensionally surrounded by plate-like crystals can be referred to as a "card house structure." Once a card house structure is formed, the liquid photocurable compound can be maintained and ink droplets can be pinned. Accordingly, combining of liquid droplets can be prevented. It is preferable that, for forming the card house structure, the photocurable compound and the gelling agent dissolving in the ink be compatible each other. In contrast to this, when phase separation between the photocurable compound and the gelling agent dissolved in the ink occurs, the card house structure may be difficult to form.

For stably discharging ink droplets of the actinic radiation-curable inkjet ink from the inkjet recording apparatus, it is required that compatibility between the photocurable compound and the gelling agent should be satisfactory in the ink in a sol state (at high temperatures). Furthermore, for stably preventing combining of droplets even at the time of high-speed printing, it is required that after ink droplets are landed on a recording medium, the gelling agent should be immediately crystallized to form a strong card house structure.

Examples of such a gelling agent include:
aliphatic ketone compounds;
aliphatic ester compounds;
petroleum waxes such as paraffin wax, microcrystalline wax, and petrolatum;
plant-derived waxes such as candelilla wax, carnauba wax, rice wax, sumac wax, jojoba oil, solid jojoba wax, and jojoba ester;
animal-derived waxes such as beeswax, lanolin, and spermaceti;
mineral waxes such as montan wax and hydrogenated wax;
hydrogenated castor oil and hydrogenated castor oil derivatives;
modified waxes such as montan wax derivatives, paraffin wax derivatives, microcrystalline wax derivatives, and polyethylene wax derivatives;
higher fatty acids such as behenic acid, arachidic acid, stearic acid, palmitic acid, myristic acid, lauric acid, oleic acid, and erucic acid;
higher alcohols such as stearyl alcohol and behenyl alcohol;
hydroxystearic acids such as 12-hydroxystearic acid;
12-hydroxystearic acid derivatives; fatty acid amides such as lauric acid amide, stearic acid amide, behenic acid amide, oleic acid amide, erucic acid amide, ricinoleic acid amide, and 12-hydroxystearic acid amide (e.g., NIKKA AMIDE series manufactured by Nippon Kasei Chemical Co., Ltd., ITOWAX series manufactured by Ito Oil Chemicals Co., Ltd., and FATTY AMID series manufactured by Kao Corporation);
N-substituted fatty acid amides such as N-stearyl stearic acid amide, N-oleyl palmitic acid amide;
specialty fatty acid amides such as N,N'-ethylene bis-stearylamide, N,N'-ethylene bis-12-hydroxystearylamide, and N,N'-xylylene bisstearylamide;
higher amines such as dodecylamine, tetradecylamine, and octadecylamine;
fatty acid ester compounds such as stearyl stearic acid, oleyl palmitic acid, glycerin fatty acid ester, sorbitan fatty acid ester, propylene glycol fatty acid esters, ethylene glycol fatty acid esters, and polyoxyethylene fatty acid esters (e.g., EMALLEX series manufactured by Nihon Emulsion Co., Ltd., RIKEMAL series manufactured by Riken Vitamin Co., Ltd., and POEM series manufactured by Riken Vitamin Co., Ltd.);
esters of sucrose fatty acids such as sucrose stearic acid and sucrose palmitic acid (e.g., RYOTO Sugar Ester series manufactured by Mitsubishi-Kagaku Foods Corporation);
synthetic waxes such as polyethylene wax and α-olefin-maleic anhydride copolymer wax (UNILIN series manufactured by Baker-Petrolite, etc.);
dimeric acids;
dimer diols (PRIPOR series manufactured by CRODA International Plc, etc.);
fatty acid inulins such as inulin stearate;
fatty acid dextrins such as dextrin palmitate and dextrin myristate (RHEOPEARL series manufactured by Chiba Flour Milling Co., Ltd., etc.);
glyceryl behenate/eicosanedioate;
polyglyceryl behenate/eicosanedioate (NOMCORT series manufactured by Nisshin Oillio Group, Ltd., etc.);
amide compounds such as N-lauroyl-L-glutamic acid dibutylamide and N-(2-ethylhexanoyl)-L-glutamic acid dibutylamide (available from Ajinomoto Fine-Techno Co., Inc.);
dibenzylidene sorbitols such as 1,3:2,4-bis-O-benzylidene-D-glucitol (available from New Japan Chemical Co., Ltd. as GELOL D); and
low molecular weight oil gelling agents described in Japanese Patent Application Laid-Open Nos. 2005-126507, 2005-255821, and 2010-111790.

Preferably, the actinic radiation-curable inkjet ink for the image forming method according to one aspect of the present invention contains a compound containing a straight-chain alkyl group having 12 or more carbon atoms, as the gelling agent. When the gelling agent contains a straight-chain alkyl group having 12 or more carbon atoms, the above-mentioned "card house structure" can be easily formed. The gelling agent may have a branched chain.

Specific examples of the gelling agent containing a straight-chain alkyl group having 12 or more carbon atoms include aliphatic ketone compounds, aliphatic ester compounds, higher fatty acids, higher alcohols, and fatty acid amides, which contain a straight-chain alkyl group having 12 or more carbon atoms.

It is to be noted that a gelling agent having a polar group such as —OH or —COOH at the terminals of the alkyl chain may have poor stability in the ink in a sol state and thus precipitation or phase separation may occur. Moreover, bleedout of the gelling agent from the cured film of the ink may occur slowly over time. In view of such a circumstance, the gelling agent is preferably an aliphatic ketone compound or an aliphatic ester compound. Examples of such a preferable gelling agent include compounds represented by the following Formulas (G1) and (G2):

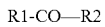  Formula (G1):

  Formula (G2):

In Formulas (G1) and (G2), R1 to R4 each independently represent an alkyl group having a straight-chain moiety having 12 or more carbon atoms, and R1 to R4 may also have a branched moiety.

In Formula (G1), preferably, the alkyl groups represented by R1 and R2 each independently include a straight-chain alkyl group having 12 or more and 25 or less carbon atoms. If the straight-chain moiety contained in each of the groups represented by R1 and R2 has less than 12 carbon atoms, the resulting compound fails to function as a gelling agent due to the absence of sufficient crystallinity. In addition, sufficient space for enclosing therein the photocurable compound would not be formed in the above-mentioned card house structure. On the other hand, if the straight-chain moiety contained in each of the groups represented by R1 and R2 has more than 25 carbon atoms, the resulting compound would not be soluble in the ink unless the discharge temperature of the ink is raised due to an excessively high melting point.

Examples of the aliphatic ketone compound represented by Formula (G1) include dilignoceryl ketone (C24-C24), dibehenyl ketone (C22-C22, melting point: 88° C.), distearyl ketone (C18-C18, melting point: 84° C.), dieicosyl ketone (C20-C20), dipalmityl ketone (C16-C16, melting point: 80° C.), dimyristyl ketone (C14-C14), dilauryl ketone (C12-C12, melting point: 68° C.), lauryl myristyl ketone (C12-C14), lauryl palmityl ketone (C12-C16), myristyl palmityl ketone (C14-C16), myristyl stearyl ketone (C14-C18), myristyl behenyl ketone (C14-C22), palmityl stearyl ketone (C16-C18), palmityl behenyl ketone (C16-C22), and stearyl behenyl ketone (C18-C22).

Examples of commercially available products of the compound represented by Formula (G1) include 18-Pentatriacontanon (manufactured by Alfa Aeser), Hentriacontan-16-on (manufactured by Alfa Aeser), and KAO Wax T1 (manufactured by Kao Corporation).

These aliphatic ketone compounds may be contained either singly or as a mixture of two or more types in the actinic radiation-curable inkjet ink.

In Formula (G2), the alkyl groups represented by R3 and R4 are not particularly limited and are each independently, preferably, an alkyl group containing a straight-chain moiety having 12 to 26 carbon atoms. When the straight-chain moiety contained in each of the alkyl groups represented by R3 and R4 has 12 to 26 carbon atoms, the resulting compound can form the above-mentioned card house structure and does not have an excessively high melting point while having crystallinity necessary for the gelling agent, similarly to the compound represented by Formula (G1).

Examples of the aliphatic ester compound represented by Formula (G2) include behenyl behenate (C21-C22, melting point: 70° C.), icosyl icosanoate (C19-C20), stearyl stearate (C17-C18, melting point: 60° C.), palmityl stearate (C17-C16), lauryl stearate (C17-C12), cetyl palmitate (C15-C16, melting point: 54° C.), stearyl palmitate (C15-C18), myristyl myristate (C13-C14, melting point: 43° C.), cetyl myristate (C13-C16, melting point: 50° C.), octyldodecyl myristate (C13-C20), stearyl oleate (C17-C18), stearyl erucate (C21-C18), stearyl linoleate (C17-C18), behenyl oleate (C18-C22), myricyl cerotate (C25-C16), and arachidyl linoleate (C17-C20).

Examples of commercially available products of the aliphatic ester compound represented by Formula (G2) include UNISTAR M-2222SL (manufactured by NOF Corporation), EXCEPARL SS (manufactured by Kao Corporation, melting point: 60° C.), EMALEX CC-18 (manufactured by Nihon Emulsion Co., Ltd.), AMREPS PC (manufactured by Kokyu Alcohol Kogyo Co., Ltd.), EXCEPARL MY-M (manufactured by Kao Corporation), SPERMACETI (manufactured by NOF Corporation), and EMALEX CC-10 (manufactured by Nihon Emulsion Co., Ltd.). Most of these commercially available products are mixtures of two or more types and may therefore be separated and purified, if necessary.

These aliphatic ester compounds may be contained either singly or as a mixture of two or more types in the actinic radiation-curable inkjet ink.

For improving pinning properties of the ink, it is preferable to increase the difference between the levels of affinity of the gelling agent and the liquid compound. In the case of using a hydrophobic gelling agent such as a wax exemplified herein, the gelling agent is easily precipitated and the pinning properties of the ink are improved by using a hydrophilic liquid compound having an SP value in a range from 8.5 to 10.0.

The amount of the gelling agent contained in the actinic radiation-curable inkjet ink is preferably from 0.5 to 10.0 wt %, and more preferably from 1 to 7 wt % relative to the total amount of the ink. If the amount is less than 0.5 wt %, there is the possibility that ink droplets cannot undergo gelation (temperature-induced sol-gel phase transition). On the other hand, if the amount exceeds 10 wt %, the gelling agent may not be sufficiently dissolved in the ink so that ability of ink droplet discharge is lowered.

(Photopolymerization Initiator)

The actinic radiation-curable inkjet ink further contains a photopolymerization initiator.

The photopolymerization initiator includes an intramolecular bond cleaving type and an intramolecular hydrogen withdrawing type. Examples of the intramolecular bond cleaving type photopolymerization initiator include acetophenones such as diethoxy acetophenone, 2-hydroxy-2-methyl-1-phenylpropan-1-one, benzyl dimethyl ketal, 1-(4-isopropyl phenyl)-2-hydroxy-2-methylpropan-1-one, 4-(2-hydroxy ethoxy)phenyl-(2-hydroxy-2-propyl)ketone, 1-hydroxy cyclohexyl phenyl ketone, 2-methyl-2-morpholino-(4-thio methylphenyl) propan-1-one, and 2-benzyl- 2-dimethylamino-1-(4-morpholino phenyl)-butanone; benzoins such as benzoin, benzoin methyl ether and benzoin isopropyl ether; acyl phosphine oxides such as 2,4,6-trimethyl benzoin diphenyl phosphine oxide; benzil, and methylphenyl glyoxy ester.

Examples of the intramolecular hydrogen withdrawing type photopolymerization initiator include benzophenones such as benzophenone, o-benzoyl benzoic acid methyl-4-phenyl benzophenone, 4,4'-dichloro benzophenone, hydroxy benzophenone, 4-benzoyl-4'-methyldiphenyl sulfide, acrylated benzophenone, 3,3',4,4'-tetra-(t-butyl peroxy carbonyl) benzophenone; and 3,3'-dimethyl-4-methoxy benzophenone; thioxanthones such as 2-isopropyl thioxanthone, 2,4-dimethyl thioxanthone, 2,4-diethyl thioxanthone, and 2,4-dichloro thioxanthone; aminobenzophenones such as Michler's ketone and 4,4'-diethylaminobenzophenone; 10-butyl-2-chloro acridone, 2-ethyl anthraquinone, 9,10-phenanthrene quinone, and camphor quinone.

The content of the photopolymerization initiator in the actinic radiation-curable inkjet ink may vary depending on the type of the actinic radiation or the photocurable compound, and the like. The content of the photopolymerization initiator is preferably from 0.01 wt % to 10 wt %.

The photopolymerization initiator in the actinic radiation-curable inkjet ink may contain a photoacid generating agent. Examples of the photoacid generating agent include compounds used for chemical amplification type photoresists or photo-cationic polymerization (refer to pages 187 to 192 of "Imaging Yo Yuki Zairyo (Organic Materials Used for Imaging Applications)" edited by The Japanese Research Association for Organic Electronics Materials published by Bunshin Publishing (1993)).

If necessary, the actinic radiation-curable inkjet ink may further contain a photopolymerization initiator auxiliary agent, a polymerization inhibitor, or the like. The photopolymerization initiator auxiliary agent may be a tertiary amine compound and is preferably an aromatic tertiary amine compound. Examples of the aromatic tertiary amine compound include N,N-dimethylaniline, N,N-diethylaniline, N,N-dimethyl-p-toluidine, N,N-dimethylamino-p-benzoic acid ethyl ester, N,N-dimethylamino-p-benzoic acid isoamyl ethyl ester, N,N-dihydroxy ethylaniline, triethylamine, and N,N-dimethyl hexylamine Among them, N,N-dimethylamino-p-benzoic acid ethyl ester and N,N-dimethylamino-p-benzoic acid isoamyl ethyl ester are preferable. These compounds may be contained either singly or in combination in the actinic radiation-curable inkjet ink.

Examples of the polymerization inhibitor include (alkyl) phenol, hydroquinone, catechol, resorcin, p-methoxyphenol, t-butyl catechol, t-butyl hydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferrone, aluminum N-nitrosophenyl hydroxylamine, tri-p-nitrophenylmethyl, N-(3-oxyanilino-1, 3-dimethylbutylidene) aniline oxide, dibutyl cresol, cyclohexanone oxime cresol, guaiacol, o-isopropylphenol, butyraldoxime, methyl ethyl ketoxime, and cyclohexanone oxime.

(Colorant)

Generally, the actinic radiation-curable inkjet ink further contains a colorant. The colorant can be a dye or a pigment. A pigment is more preferable because it has satisfactory dispersibility in ink constituents and is excellent in weather resistance.

The dye can be an oil soluble dye or the like. Examples of the oil soluble dye include the following various dyes. Examples of magenta dye include MS Magenta VP, MS Magenta HM-1450, HM Magenta HSo-147 (all manufactured by Mitsui-Toatsu Chemicals), AIZEN SOT Red-1, AIZEN SOT Red-2, AIZEN SOT Red-3, AIZEN SOT Pink-1, SPIRON Red GEH SPECIAL (all manufactured by Hodogaya Chemical), RESOLIN Red FB 200%, MACROLEX Red Violet R, MACROLEX ROT5B (all manufactured by of Bayer Japan), KAYASET Red B, KAYASET Red 130, KAYASET Red 802 (all manufactured by Nippon Kayaku), PHLOXIN, ROSE BENGAL, ACID Red (all manufactured by Daiwa Kasei), HSR-31, DIARESIN Red K (all manufactured by Mitsubishi-Kasei), and Oil Red (manufactured by BASF Japan).

Examples of cyan dye include MS Cyan HM-1238, MS Cyan HSo-16, HM Cyan HSo-144, MS Cyan VPG (all manufactured by Mitsui-Toatsu Chemical), AIZEN SOT Blue-4 (manufactured by Hodogaya Chemical Company), RESOLIN BR, Blue BGLN 200%, MACROLEX Blue RR, CERES Blue GN, SIRIUS SUPRA TURQ, Blue Z-BGL, SIRIUS SUPRA TURQ, Blue FB-LL 330% (all manufactured by Bayer Japan), KAYASET Blue FR, KAYASET Blue N, KAYASET Blue 814, Turq. Blue GL-5 200, Light Blue BGL-5 200 (all manufactured by Nippon Kayaku), DAIWA Blue 7000, Oleosol Fast Blue GL (all manufactured by Daiwa Kasei), DIARESIN Blue P (manufactured by Mitsubishi-Kasei), SUDAN Blue 670, NEOPEN Blue 808, and ZAPON Blue 806 (all manufactured by BASF Japan).

Examples of yellow dye include MS Yellow HSm-41, Yellow KX-7, Yellow EX-27 (Mitsui-Toatsu Chemical), AIZEN SOT Yellow-1, AIZEN SOT Yellow-3, AIZEN SOT Yellow-6 (all manufactured by Hodogaya Chemical), MACROLEX Yellow 6G, MACROLEX FLUOR, Yellow 1 OGN (all manufactured by Bayer Japan), KAYASET Yellow SF-G, KAYASET Yellow 2G, KAYASET Yellow A-G, KAYASET Yellow E-G (all manufactured by Nippon Kayaku), DAIWA Yellow 330HB (manufactured by of Daiwa Kasei), HSY-68 (manufactured by Mitsubishi-Kasei), SUDAN Yellow 146, and NEOPEN Yellow 075 (all manufactured by BASF Japan).

Examples of black dye include MS Black VPC (manufactured by Mitsui-Toatsu Chemical), AIZEN SOT Black-1, AIZEN SOT Black-5 (all manufactured by Hodogaya Chemical), RESORIN Black GSN 200%, RESOLIN Black BS (all manufactured by Bayer Japan), KAYASET A-N (manufactured by Nippon Kayaku), DAIWA Black MSC (manufactured by Daiwa Kasei), HSB-202 (manufactured by Mitsubishi-Kasei), NEPTUNE Black X60, and NEOPEN Black X58 (all manufactured by BASF Japan).

The pigment is not particularly limited and can be, for example, an organic pigment or an inorganic pigment of any of the following numbers described in the color index.

Examples of red or magenta pigment include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257, Pigment Violet 3, 19, 23, 29, 30, 37, 50, and 88, and Pigment Orange 13, 16, 20, and 36. Examples of blue or cyan pigment include Pigment Blue 1, 15, 15:1, 15:2, 15:3, 15:4, 15:6, 16, 17-1, 22, 27, 28, 29, 36, and 60. Examples of green pigment include Pigment Green 7, 26, 36, and 50. Examples of yellow pigment include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193. Examples of black pigment include Pigment Black 7, 28, and 26.

Examples of commercially available products of the pigment include Chromo Fine Yellow 2080, 5900, 5930, AF-1300, and 2700L, Chromo Fine Orange 3700L and 6730, Chromo Fine Scarlet 6750, Chromo Fine Magenta 6880, 6886, 6891N, 6790, and 6887, Chromo Fine Violet RE, Chromo Fine Red 6820 and 6830, Chromo Fine Blue HS-3, 5187, 5108, 5197, 5085N, SR-5020, 5026, 5050, 4920, 4927, 4937, 4824, 4933GN-EP, 4940, 4973, 5205, 5208, 5214, 5221, and 5000P, Chromo Fine Green 2GN, 2GO, 2G-550D, 5310, 5370, and 6830, Chromo Fine Black A-1103, Seika Fast Yellow 10 GH, A-3, 2035, 2054, 2200, 2270, 2300, 2400(B), 2500, 2600, ZAY-260, 2700(B), and 2770, Seika Fast Red 8040, C405(F), CA120, LR-116, 1531B, 8060R, 1547, ZAW-262, 1537B, GY, 4R-4016, 3820, 3891, and ZA-215, Seika Fast Carmine 6B1476T-7, 1483LT, 3840, and 3870, Seika Fast Bordeaux 10B-430, Seika Light Rose R40, Seika Light Violet B800 and 7805, Seika Fast Maroon 460N, Seika Fast Orange 900 and 2900, Seika Light Blue C718 and A612, and Cyanine Blue 4933M, 4933GN-EP, 4940, and 4973 (all manufactured by Dainichiseika Colour & Chemicals Mfg. Co., Ltd.);

KET Yellow 401, 402, 403, 404, 405, 406, 416, and 424, KET Orange 501, KET Red 301, 302, 303, 304, 305, 306, 307, 308, 309, 310, 336, 337, 338, and 346, KET Blue 101, 102, 103, 104, 105, 106, 111, 118, and 124, and KET Green 201 (all manufactured by DIC Corporation);

Colortex Yellow 301, 314, 315, 316, P-624, 314, U10GN, U3GN, UNN, UA-414, and U263, Finecol Yellow T-13 and T-05, Pigment Yellow 1705, Colortex Orange 202, Colortex Red 101, 103, 115, 116, D3B, P-625, 102, H-1024, 105C, UFN, UCN, UBN, U3BN, URN, UGN, UG276, U456, U457, 105C, and USN, Colortex Maroon 601, Colortex Brown B610N, Colortex Violet 600, Pigment Red 122, Colortex Blue 516, 517, 518, 519, A818, P-908, and 510, Colortex Green 402 and 403, and Colortex Black 702 and U905 (all manufactured by Sanyo Color Works, LTD.);

Lionol Yellow 1405G, and Lionol Blue FG7330, FG7350, FG7400G, FG7405G, ES, and ESP-S (all manufactured by Toyo Ink Co., Ltd.);

Toner Magenta E02, Permanent Rubin F6B, Toner Yellow HG, Permanent Yellow GG-02, and Hostapeam Blue B2G (all manufactured by Hoechst Industry Ltd.);

Novoperm P-HG, Hostaperm Pink E, and Hostaperm Blue B2G (all manufactured by Clariant (Japan) K.K.); and Carbon Black #2600, #2400, #2350, #2200, #1000, #990, #980, #970, #960, #950, #850, MCF88, #750, #650, MA600, MA7, MA8, MA11, MA100, MA100R, MA77, #52, #50, #47, #45, #45L, #40, #33, #32, #30, #25, #20, #10, #5, #44, and CF9 (all manufactured by Mitsubishi Chemical Company).

The average particle size of the pigment is preferably from 0.08 to 0.5 µm. The maximum particle size of the pigment is preferably from 0.3 to 10 µm, and more preferably from 0.3 to 3 µm. By controlling the particle size of the pigment, clogging in the nozzles of the inkjet recording head can be avoided, and ink storage stability, ink transparency, curing sensitivity can be maintained.

The content of the pigment or dye is preferably from 0.1 to 20 wt %, and more preferably from 0.4 to 10 wt % relative to the total weight of the actinic radiation-curable inkjet ink. If the content of the pigment or dye is excessively low, color exhibition of an image to be obtained is insufficient. On the other hand, if it is excessively high, the ink viscosity is increased to lower the ability of discharge.

Dispersing of the pigment can be performed by using ball mill, sand mill, attritor, roll mill, agitator, HENSCHEL MIXER, colloid mill, ultrasound homogenizer, pearl mill, wet jet mill, or paint shaker, for example. Dispersing of the pigment is preferably performed such that the average particle size of the pigment particles is from 0.08 to 0.5 µm. The maximum particle size of the pigment particles is preferably from 0.3 to 10 µm, and more preferably from 0.3 to 3 µm. Dispersing the pigment is controlled by the selection of the pigment, a dispersant, and a dispersion medium, dispersion conditions, filtration conditions, and the like.

In order to enhance the dispersibility of the pigment, the actinic radiation-curable inkjet ink may further contain a dispersant. Examples of the dispersant include hydroxyl group-containing carboxylic acid esters, salts of long chain polyaminoamide and high molecular weight acid esters, salts of high molecular weight polycarboxylic acid, salts of long chain polyaminoamide and polar acid esters, high molecular weight unsaturated acid esters, high molecular weight copolymers, modified polyurethane, modified polyacrylates, anionic surfactants of polyether ester type, naphthalenesulfonic acid-formalin condensate salts, aromatic sulfonic acid-formalin condensate salts, polyoxyethylene alkyl phosphoric acid esters, polyoxyethylene nonyl phenyl ether, and stearylamine acetate. Examples of commercially available products of the dispersant include SOLSPERSE series of Avecia Biotechnology, Inc., and PB series of Ajinomoto Fine-Techno Co., Inc.

If necessary, the actinic radiation-curable inkjet ink may further contain a dispersion promoter. The dispersion promoter can be selected according to the pigment.

The total amount of a dispersant and a dispersion promoter is preferably from 1 to 50 wt % relative to the weight of pigment.

If necessary, the actinic radiation-curable inkjet ink may further contain a dispersion medium for dispersing the pigment. For satisfactory dispersion of the pigment, the photocurable compound (in particular, monomer having low viscosity) as mentioned above is preferably a dispersion medium.

Additional Components

If necessary, the actinic radiation-curable inkjet ink may further contain additional component(s). Additional components can be various additives and additional resins. Examples of the additives include surfactants, leveling agents, matting agents, UV absorbers, IR absorbers, antibacterial agents, and basic compounds that serve to increase the storage stability of ink. Examples of the basic compounds include basic alkali metal compounds, basic alkali earth metal compounds, and basic organic compounds such as amines. Examples of additional resins include resins for adjusting the physical properties of a cured film; examples thereof include polyester resins, polyurethane resins, vinyl resins, acrylic resins, rubber resins, and waxes.

Physical Properties of Actinic Radiation-Curable Inkjet Ink

Because the actinic radiation-curable inkjet ink contains the gelling agent as mentioned above, it undergoes temperature-induced reversible sol-gel phase transition. Since an actinic radiation-curable ink which undergoes sol-gel phase transition is a liquid (sol) at high temperatures (e.g., about 80° C.), the ink can be discharged in a sol state from the inkjet recording head. Once the actinic radiation-curable inkjet ink is discharged at a high temperature, ink droplets (dots) are landed on a recording medium and undergo gelation by natural cooling. Accordingly, combining of neighboring dots is prevented and thus image quality improves.

For enhancing ability of ink droplet discharge, the viscosity of the ink at a high temperature is preferably the same or lower than a predetermined value. Specifically, the viscosity at 80° C. of the actinic radiation-curable inkjet ink is preferably from 3 to 20 mPa·s. In order to prevent combining of neighboring dots, the ink viscosity at room temperature after landing preferably has a certain value or more. Specifically, the viscosity at 25° C. of the actinic radiation-curable inkjet ink is preferably 1,000 mPa·s or more.

The gelation temperature of the ink is preferably 40° C. or higher and 70° C. or lower, and more preferably 50° C. or higher and 65° C. or lower. In the case where the discharge temperature is near 80° C., if the gelation temperature of the ink exceeds 70° C., gelation easily occurs at the time of discharge, thus reducing ability of ink discharge. On the other hand, if the gelation temperature is lower than 40° C., the ink after landed on a recording medium is less likely to undergo gelation quickly. The gelation temperature is a temperature when fluidity is lowered by gelation of the ink in a sol state in a process of cooling the sol-state ink.

The viscosity at 80° C., viscosity 25° C. and gelation temperature of the ink can be found by measuring a temperature change in dynamic viscoelasticity of the ink using a rheometer. Specifically, when the ink is heated to 100° C. and cooled to 20° C. with conditions including shear rate of 11.7 (l/s) and temperature decrease rate of 0.1° C./s, a temperature change curve of the viscosity is obtained. Further, the viscosity at 80° C. and the viscosity at 25° C. can be obtained by reading each of the viscosities at 80° C. and 25° C. in a temperature change curve of the viscosity. The gelation temperature can be defined as a temperature at which the viscosity largely changes in a temperature change curve of the viscosity, and can be set to be, for example, a temperature at which the viscosity is 500 mPa·s.

As for the rheometer, stress control type rheometer Physica MCR series manufactured by Anton Paar can be used. The size of the corn plate can be 75 mm and the corn angle can be 1.0°.

The actinic radiation-curable inkjet ink according to one aspect of the present invention contains a liquid compound that is inactive against actinic radiation. The liquid compound exists as a liquid in an ink film after irradiation with actinic radiation. This liquid compound volatizes from the surface of the ink film or penetrates into the recording medium, whereby the thickness of the film is gradually decreased. As the thickness is decreased, irregularities or level differences in the surface of the film are also reduced. More specifically, a printed image composed of the actinic radiation-curable inkjet ink according to one aspect of the present invention has high smoothness and also has highly glossy surface.

Moreover, ink components in the actinic radiation-curable inkjet ink according to one aspect of the present invention easily enter the recording medium, together with the liquid compound. Also, the adhesion between the recording medium and the printed image is high.

Method for Preparing Inkjet Ink

The actinic radiation-curable inkjet ink is obtained by mixing the aforementioned photocurable compound, liquid compound, gelling agent, photopolymerization initiator, colorant, and the like under heating. Preferably, a pigment dispersion containing a colorant (in particular, pigment) dispersed in part of the photocurable compound is prepared and mixed with other ink components. The obtained ink is preferably filtered through a predetermined filter.

2. Image Forming Method

The image forming method according to one aspect of the present invention includes at least 3 steps described below.

(1) A step of attaching droplets of the actinic radiation-curable inkjet ink to a recording medium by discharging the droplets from an inkjet recording head;

(2) a step of curing the ink droplets landed on the recording medium by irradiating the droplets with light from an LED light source; and (3) a step of heating the recording medium before the step (2) and/or after the step (2).

In the image forming method according to one aspect of the present invention, the step of heating the recording medium is performed before and/or after the step (3), i.e., before the irradiation with actinic radiation and/or after the irradiation with actinic radiation. By a step of heating the recording medium before the irradiation with actinic radiation (hereinafter, also referred to as "step (3-1)"), the ink before curing can be easily leveled. By a step of heating the recording medium after the irradiation with actinic radiation (hereinafter, also referred to as "step (3-2)", the liquid compound volatizes from a film after curing to facilitate alleviating irregularities or level differences generated on the surface of the film.

In the image forming method according to one aspect of the present invention, the step (3) may be performed only between the step (1) and the step (2) or only after the step (2). It is preferable that the step (3) be performed both between the step (1) and the step (2) and after the step (2) from the perspective of smoothing a printed image.

Step (1)

Droplets of the actinic radiation-curable inkjet ink are discharged from an inkjet recording apparatus to a recording medium. The actinic radiation-curable inkjet ink is the inkjet ink described above.

The ink droplets are discharged from the inkjet recording head of the inkjet recording apparatus. To enhance ability of the ink droplet discharge, the temperature of the inkjet ink inside the inkjet recording head is preferably set such that it is from 10 to 30° C. higher than the gelation temperature of the ink. If the ink temperature inside the inkjet recording head is lower than (gelation temperature)+10° C., the ink undergoes gelation inside the inkjet recording head or at the surface of the nozzle, and thus ability of ink droplet discharge can be easily lowered. On the other hand, if the ink temperature inside the inkjet recording head is higher than (gelation temperature)+30° C., the ink is at excessively high temperature, and thus the ink components may be degraded.

The ink is heated in the inkjet recording head of the inkjet recording apparatus, in the ink channel connected to the inkjet recording head, or in the ink tank connected to the ink channel, for example.

The amount of liquid per droplet discharged from each nozzle of the inkjet recording head may vary depending on the resolution of an image. However, it is preferably from 0.5 to 10 pl, and more preferably from 0.5 to 2.5 pl for forming a high-resolution image. In order to form a high-resolution image with such a liquid amount, droplets of the ink after landing are not combined, more specifically, sufficient sol-gel phase transition of the ink is necessary. The sol-gel transition of the above-mentioned actinic radiation-curable inkjet ink occurs immediately. Accordingly, it is possible to stably form a high-resolution image even with such a liquid amount.

The droplets of the ink landed on a recording medium are cooled and quickly undergo gelation by sol-gel phase transition. As a result, the ink droplets can be pinned without being scattered. Because it is less likely that oxygen enters the droplets, curing of the photocurable compound is less likely to be inhibited by oxygen.

The recording medium can be either paper or a resin film. Examples of the paper include coated paper for printing and coated paper B for printing. Further, examples of the resin film include a polyethylene terephthalate film, polypropylene film and a vinyl chloride film. In particular, a material that has high affinity for the liquid compound and facilitates the penetration of the liquid compound is preferable.

By allowing ink droplets to be discharged from the inkjet recording head, the ink droplets are attached onto a recording medium. The temperature when the droplets of the color ink are landed on the recording medium is preferably set such that it is from 10 to 20° C. lower than the gelation temperature of this ink. If the temperature of the recording medium is excessively low, the ink droplets undergo gelation and pinned too fast so that leveling of the ink droplets does not occur sufficiently, and as a result, the glossiness of an image may be lowered. On the other hand, if the temperature of the recording medium is excessively high, it is difficult for the ink droplets to undergo gelation, and therefore neighboring dots of the ink droplets may be mixed with each other. By appropriately adjusting the temperature of the recording medium, it is possible to achieve both a moderate level of leveling and appropriate pinning that do not allow for mixing among neighboring dots of the ink droplets.

The conveyance speed of the recording medium is preferably from 30 to 120 mm/s. As the conveyance speed increases, the image forming speed also increases, and thus desirable. However, if the conveyance speed is excessively high, the image quality is degraded or photocuring of ink droplets (described later) become insufficient, for example.

Step (3-1)

As described above, the step of heating the recording medium may be performed between the step (1) and the step (2), and more specifically, between after the ink droplets are landed on the recording medium and before the ink droplets are irradiated with actinic radiation. By heating the recording medium before irradiation with actinic radiation, the ink droplets are leveled to reduce irregularities or level differences generated on the surface of the film.

The temperature of the recording medium is preferably a temperature that is from 10 to 20° C. lower than the gelation temperature of the ink. If the temperature of the recording medium is excessively high, the viscosity of the ink is lowered, and therefore neighboring dots of the ink droplets may be mixed with each other.

The heating time (the time between after the ink droplets are landed on the recording medium and before the ink droplets are irradiated with actinic radiation) is preferably within 10 seconds, more preferably within 0.001 seconds to 5 seconds, and further preferably within 0.01 seconds to 2 seconds. If the heating time is long, neighboring ink droplets might be combined with each other.

Step (2)

By irradiating the ink droplets landed on a recording medium with actinic radiation from an LED light source, the photocurable compounds contained in the ink droplets are crosslinked or polymerized to cure the ink droplets.

The actinic radiation to be directed on the ink droplets attached to a recording medium is preferably ultraviolet rays from an LED light source. Specific examples thereof include 395 nm, Water Cooled LED manufactured by Phoseon Technology. Examples of a general UV light source include metal halide lamps. Use of an LED light source can prevent melting of the ink droplets by radiation heat, i.e., can prevent poor curing at the surface of the cured film of the ink droplets.

An LED light source is installed such that it provides UV ray of from 370 to 410 nm wavelength with peak illuminance from 0.5 to 10 W/cm$^2$ and more preferably from 1 to 5 W/cm$^2$ on a surface of the image. The light quantity to be irradiated onto an image is adjusted to be lower than 350 mJ/cm$^2$ in order to limit the irradiation of the ink droplets with radiation heat.

The irradiation with actinic radiation is preferably performed after discharging the ink droplets from all inkjet recording heads that are accommodated in a head carriage.

Step (3-2)

After the irradiation with actinic radiation, the recording medium on which the film has been formed is preferably further heated. By heating the recording medium, the liquid compound can volatize easily from the film to decrease the thickness of the film. Therefore, irregularities or level differences generated on the surface of the film are reduced. As a result, a printed image having high smoothness is obtained.

The temperature of the recording medium is preferably set to be a temperature higher than that of the recording medium before the irradiation with actinic radiation, so that the liquid compound volatizes sufficiently. Specifically, the temperature is preferably from 30 to 80° C., and more preferably from 40 to 55° C. If the heating temperature is excessively low, the liquid compound might not volatize sufficiently. On the other hand, if the heating temperature is excessively high, the film or the recording medium is more susceptible to heat.

The heating time of the recording medium is preferably from about 1 to about 100 seconds, and more preferably from 2 to 20 seconds. If the heating time is excessively short, the liquid compound might not volatize sufficiently. On the other hand, if the heating time is excessively long, there is the possibility that the recording medium is deformed due to heat.

Inkjet Recording Apparatus

The image forming method according to one aspect of the present invention can be carried out by using an inkjet recording apparatus of actinic radiation-curable inkjet type. The inkjet recording apparatus of an actinic radiation-curable inkjet type includes line recording type (single pass recording type) and serial recording type. Although it may be suitably selected depending on desired resolution or recording speed, the line recording (single pass recording type) is preferred from the viewpoint of high speed recording.

Figure 1B:
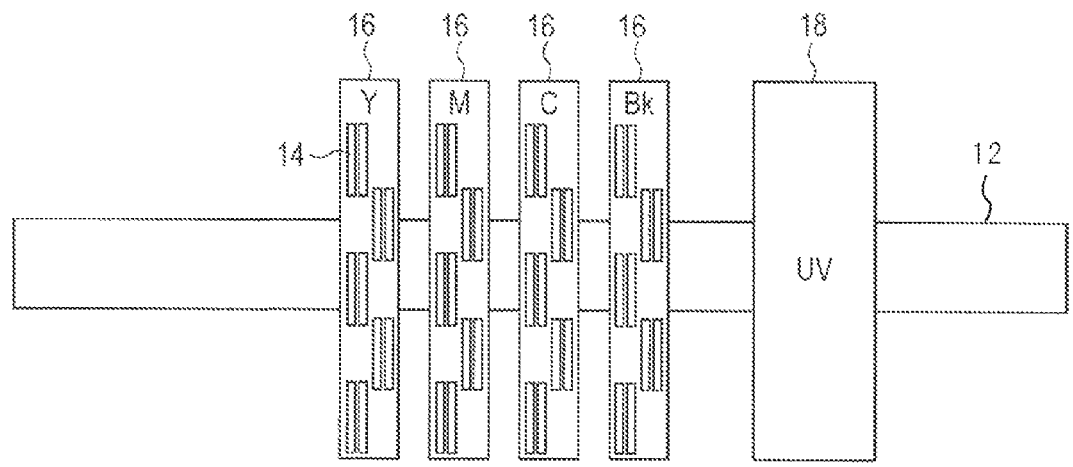
FIG. 1B illustrates one example of the configuration of a main part of an inkjet recording apparatus of line recording type (top view)

FIG. 1A is a side view illustrating one example of the configuration of a main part of an inkjet recording apparatus of line recording type, and FIG. 1B is a top view thereof.

As illustrated in FIGS. 1A and 1B inkjet recording apparatus 10 has head carriage 16 for accommodating a plurality of inkjet recording head 14, ink channel 30 connected to head carriage 16, ink tank 31 for storing the ink to be fed via ink channel 30, and Light irradiation section 18 for covering ink tank 31 and the entire width of recording medium 12 and also arranged at a downstream side of head carriage 16 (conveyance direction of the recording medium), and temperature control section 19 installed on a backside of recording medium 12.

Head carriage 16 is fixedly arranged so as to cover the entire width of recording medium 12 and accommodates a plurality of inkjet recording heads 14 that are installed for each color. Inkjet recording head 14 is designed to receive ink. For example, an ink can be supplied from a non-illustrated ink cartridge or the like that is added in a freely-mountable manner to inkjet recording apparatus 10 either directly or by non-illustrated means for ink supply.

A plurality of inkjet recording heads 14 is installed for each color in the conveyance direction of recording medium 12. The number of inkjet recording heads 14 that is arranged in the conveyance direction of recording medium 12 is determined based on the nozzle density of inkjet recording head 14 and the resolution of a printed image. For example, when an image having the resolution of 1,440×1,440 dpi is formed by using inkjet recording head 14 with a drop volume of 2 pl and a nozzle density of 360 dpi, four of inkjet recording head 14 can be arranged in a staggered manner relative to the conveyance direction of recording medium 12. Further, when an image having the resolution of 720× 720 dpi is formed by using inkjet recording head 14 with a drop volume of 6 pl and a nozzle density of 360 dpi, two of inkjet recording head 14 can be arranged in a staggered manner. As described herein, dpi represents the number of liquid droplets (dots) per 2.54 cm.

Ink tank 31 is connected to head carriage 16 via ink channel 30. Ink channel 30 is a passage for supplying an ink in ink tank 31 to head carriage 16. For stable discharge of ink droplets, the ink present in ink tank 31, ink channel 30, head carriage 16, and inkjet recording head 14 is heated to a predetermined temperature to maintain the gel state.

Light irradiation section 18 covers the entire width of recording medium 12 and it is arranged at a downstream side of head carriage 16 relative to the conveyance direction of the recording medium. Further, light irradiation section 18 irradiates, with light, the liquid droplets which have been discharged from inkjet recording head 14 and landed on the recording medium so as to cure the liquid droplets.

Temperature control section 19 (19a, 19b and 19c) is installed on a backside of recording medium 12 and it maintains recording medium 12 at a predetermined temperature. Temperature control section 19 can be various heaters or the like, for example. Temperature control section 19a controls the temperature of the recording medium when the ink droplets are landed on the recording medium. Moreover, temperature control section 19b controls the temperature of the recording medium from after the ink droplets are landed on the recording medium to before the ink droplets are irradiated with light. Furthermore, temperature control section 19c controls the temperature of the recording medium after the light irradiation.

Hereinafter, the image forming method using inkjet recording apparatus 10 of a line recording type is described. Recording medium 12 is conveyed to a region between head carriage 16a of inkjet recording apparatus 10 and temperature control section 19. Meanwhile, recording medium 12 is adjusted to a predetermined temperature by temperature control section 19a. Subsequently, the ink droplets at a high temperature are discharged from inkjet recording head 14 of head carriage 16 and attached to (landed on) recording medium 12. Then, recording medium 12 is adjusted to a predetermined temperature by temperature control section 19b. Further, the ink droplets attached to recording medium 12 are cured by irradiation with light using light irradiation section 18. Then, recording medium 12 is adjusted to a predetermined temperature by temperature control section 19c.

The total film thickness of the ink droplet after curing is preferably from 2 to 25 μm. The term "total film thickness of the ink droplet" refers to a maximum value of the film thickness of the ink droplet drawn on a recording medium.

Figure 2:
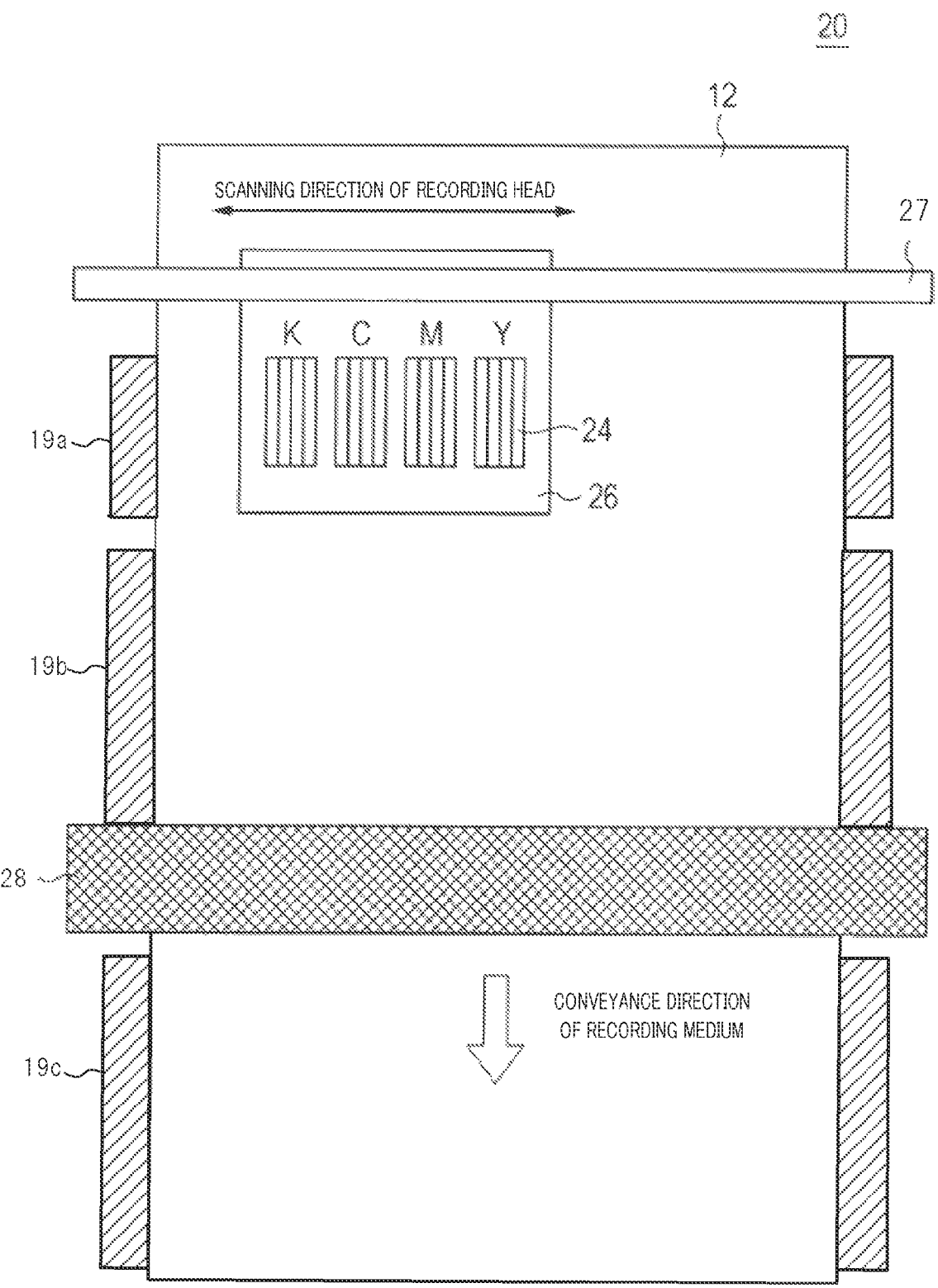
FIG. 2 illustrates an example of the configuration of a main part of an inkjet recording apparatus of serial recording type.

FIG. 2 is a diagram illustrating an example of the configuration of main parts of an inkjet recording apparatus 20 of a serial recording type. As illustrated in FIG. 2, inkjet recording apparatus 20 can be configured in the same manner as that depicted in FIGS. 1A and 1B except that it has head carriage 26 which has a width narrower than the entire width of the recording medium and accommodates a plurality of inkjet recording heads 24 instead of head carriage 16, and guide section 27 for moving head carriage 26 in the width direction of recording medium 12.

In inkjet recording apparatus 20 of serial recording type, head carriage 26 discharges the ink droplets from inkjet recording head 24 accommodated in head carriage 26 while moving along guide section 27 in the width direction of recording medium 12. Once head carriage 26 moves completely in the width direction of recording medium 12 (for each pass), recording medium 12 is delivered in the conveyance direction. Then, the film is cured in light irradiation section 28. Except those operations, the image is recorded in almost the same manner as inkjet recording apparatus 10 of a line recording type that is described above.

EXAMPLES

Hereinafter, the present invention will be described in more detailed with reference to Examples, but it is not understood that the scope of the present invention is limited to Examples.

Actinic radiation-curable inkjet inks of each Example and Comparative Example were prepared using the following components.

(Photocurable Compound)

NK ESTER A-400 (manufactured by Shin-Nakamura Chemical Co., Ltd.): polyethylene glycol diacrylate (C Log P value: 0.47)

CD561 (manufactured by Sartomer Company, Inc.): alkoxylated hexanediol diacrylate (C Log P value: 2.52)

SR499 (manufactured by Sartomer Company, Inc.): 6EO modified trimethylolpropane triacrylate (C Log P value: 3.57)

SR494 (manufactured by Sartomer Company, Inc.): 4EO modified pentaerythritol tetraacrylate (C Log P value: 2.28)

Miramer M360 (manufactured by Miwon): PO modified trimethylolpropane triacrylate (C Log P value: 4.90)

Laromer PE9074 (manufactured by BASF): polyester acrylate oligomer

CN2270 (manufactured by Sartomer Company, Inc.): polyester acrylate oligomer (Gelling Agent)

KAO Wax T1 (manufactured by Kao Corporation): distearyl ketone

FATTY AMIDE T (manufactured by Kao Corporation): stearic acid amide

LUNAC BA (manufactured by Kao Corporation): behenic acid (Liquid Compound)

Anisole (melting point: −37° C., boiling point: 153° C., SP value: 9.4)

Isophorone (melting point: −8.1° C., boiling point: 218° C., SP value: 9.8)

Propylene glycol monomethyl ether (melting point: −96° C., boiling point: 121° C., SP value: 10.19)

Propylene glycol-n-propyl ether (melting point: −80° C., boiling point: 150° C., SP value: 9.82)

Dipropylene glycol dimethyl ether (melting point: −80° C., boiling point: 175° C., SP value: 7.88)

Dipropylene glycol methyl propyl ether (melting point: lower than 25° C., boiling point: 203° C., SP value: 7.99)

Ethyl acetate (melting point: −83.6° C., boiling point: 77, SP value: 8.74)

Butyl acetate (melting point: −74° C., boiling point: 126° C., SP value: 8.7)

Cyclohexanol acetate (melting point: −77° C., boiling point: 173° C., SP value: 9.18)

Propylene glycol monomethyl ether acetate (melting point: −65° C., boiling point: 146° C., SP value: 8.73)
(Photopolymerization Initiator)
DAROCURE TPO (manufactured by BASF)
ITX (manufactured by DKSH Japan)
(Surfactant)
KF-352 (manufactured by Shin-Etsu Chemical Company)
(Sensitization Promoter)
Kayacure EPA (manufactured by Nippon Kayaku)
(Preparation of Cyan Pigment Dispersion 1)

A pigment dispersant, a photocurable compound, and a polymerization inhibitor given below were put into a stainless beaker and stirred for 1 hour under heating at 65° C. on a hot plate.

Pigment dispersant: Ajisper PB824 (manufactured by Ajinomoto Fine-Techno Co., Inc.) 9 parts Photocurable compound: APG-200 (tripropylene glycol diacrylate, manufactured by Shin-Nakamura Chemical Co., Ltd.) 70 parts Polymerization inhibitor: Irgastab UV 10 (manufactured by Chiba Japan Co., Ltd.) 0.02 parts After the resulting mixed solution is cooled to room temperature, 21 parts of cyan pigment 1 described below was added thereto. The resulting mixed solution was put and sealed together with 200 g of zirconia beads having a diameter of 0.5 mm into a glass bottle, followed by the treatment for dispersion for 8 hours using a paint shaker. Thereafter, zirconia beads were removed to prepare cyan pigment dispersion 1.

Cyan pigment 1: Pigment Blue 15:4

Examples 1 to 3 and Comparative Examples 1 to 3

Compounds were mixed according to the composition ratio described in Table 1, and stirred under heating at 100° C. Then, the obtained liquid was filtered through a #3000 metal mesh filter under heating. The resultant solution was cooled to prepare cyan ink.

Ability of ink discharge from an inkjet recording apparatus and printed images were evaluated as described below as to the obtained cyan inks. The results are shown in Table 1.

<Evaluation of Ability of Ink Discharge>

Each cyan ink was loaded in an inkjet recording apparatus of line head type equipped with a piezo type inkjet recording head. The ink was discharged from a piezo head having a nozzle diameter of 24 μm and having a resolution of 512 dpi.

The ink supplying system of the inkjet recording apparatus was composed of an ink tank, a supply pipe, an anterior ink tank immediately before the recording head, filter-attached piping, and a piezo head. The area from the anterior ink tank to the recording head portion was insulated from heat, while the ink was warmed to 80° C.

Droplets of 3.5 pl were discharged from the piezo head at a frequency of 42 kHz for 1 minute, and the discharge was halted for 30 seconds. Then, droplets were discharged for 1 minute. The status of the discharge was observed using a high-speed video camera and evaluated according to the following criteria.

A: The ink droplets were satisfactorily discharged without non-discharge or misdirection before and after the halt.

B: The misdirection of the ink occurred after the halt.

C: The non-discharge of the ink occurred after the halt.

D: The non-discharge and/or misdirection of the ink occurred at 20 or more nozzles.

<Evaluation of Printed Image>

Using an inkjet recording apparatus of line head type equipped with a piezo type inkjet recording head illustrated in FIGS. 1A and 1B, an image having a single cyan color was formed. Each cyan ink was loaded in a head carriage for cyan. The area from the anterior ink tank to the recording head portion was insulated from heat, while the ink was warmed to 80° C. Piezo heads having a nozzle diameter of 24 μm and having a resolution of 600 dpi were arranged in a staggered pattern to form nozzle arrays of 1,200 dpi. The amount of liquid per cyan ink droplet to be discharged from the head was set to 3.5 pl.

Solid single-color images, black letters of Chinese character "龍" in 4-point Mincho font, and white letters of Chinese character "龍" in 4-point Mincho font (transposed in solid images) were formed on each of coated paper for printing (OK KINFUJI+, basis weight: 127.9 g/m$^2$, manufactured by Oji Paper Co., Ltd.) and a recording medium made of a polypropylene (PP) film (thickness: 120 μm) corona-treated immediately before recording.

In the inkjet recording apparatus, the recording medium was adsorbed on a conveyor and conveyed, while the temperature of the recording medium was adjusted to those given in Table 1. The temperatures given in Table 1 represent the temperature of the recording medium at the time of ink discharge, the temperature of the recording medium for approximately 1 second from after the ink discharge to before UV irradiation, and the temperature of the recording medium for 15 seconds after the UV irradiation. Heating was carried out using an IR heater disposed on the side where the ink was landed on the recording medium.

The UV light exposure was performed using an LED lamp (center emission wavelength: 395 nm, distance between the recording medium and the lamp: 2 mm, maximum output: 7,000 mW/cm$^2$). The image formation was performed in an environment of 23° C. and 55% RH. As described herein, dpi represents the number of dots per 2.54 cm.

Each formed image was evaluated for its letter quality, blank, glossiness, relief feeling, bending resistance, rub resistance, and adhesion as described below.

Letter Quality (Image Quality)

The letters in 4-point Mincho font formed on the coated paper for printing were visually observed. Evaluation was performed according to the following criteria.

A: Both of the black letters and the white letters (transposed in solid images) are reproduced without collapse.

B: The details are collapsed but the letters are legible.

C: The white letters are heavily collapsed and are less legible.

D: Both of the white letters and the black letters are heavily collapsed and are less legible.

Blank (Image Quality)

The presence or absence of a blank (unprinted portion ascribable to combining of dots) in the solid images formed on the coated paper for printing was visually confirmed. Evaluation was performed according to the following criteria.

A: No blank is seen.

B: No complete blank is present but some sites have a light color.

C: Some blanks are seen.

D: Blanks are seen throughout the surface.

Glossiness

The glossiness was visually confirmed as to the solid images formed on the coated paper for printing and the PP film. Evaluation was performed according to the following criteria.

A: Homogeneous glossiness is obtained.
B: Glossiness is slightly low but is homogeneous.
C: Glossiness is low.
D: No glossiness is obtained.

Relief Feeling

The relief feeling was visually confirmed as to the solid images formed on the coated paper for printing and the PP film. Evaluation was performed according to the following criteria.

A: No level differences are seen at the boundary between the image-formed area and the non-image-formed area.
B: Level differences are slightly perceivable at the boundary between the image-formed area and the non-image-formed area.
C: Level difference is seen at the boundary between the image-formed area and the non-image-formed area.
D: Significant level differences are seen at the boundary between the image-formed area and the non-image-formed area.

Bending Resistance

The solid images formed on the PP film were left for 24 hours in an environment of 25° C. and 60% RH and then folded in half Evaluation was performed according to the following criteria.

A: The image film is not torn.
B: The image film is slightly cracked in the folded portion.
C: The image film is torn in the folded portion.
D: The image film is heavily torn in the folded portion so that the image is misaligned.

Rub Resistance

The rub resistance of the solid images formed on the PP film was evaluated in accordance with the method described in "JIS Standards K5701-1 6.2.3 Rub Resistance Test". A sheet of recording paper cut in an appropriate size was placed on the image, a load was applied thereon in accordance with the JIS Standards described above, and the paper sheet was rubbed against the image. Thereafter, an extent of decrease in the density of the image was visually observed and the rub resistance was evaluated according to the following criteria.

A: Even though the image is rubbed 100 strokes or more with the paper sheet, absolutely no change is recognized in the image.
B: Decrease in the density of the image is recognized at the time when the image has been rubbed 100 strokes, but the decrease is a practically acceptable level.
C: Obvious decrease in the density of the image is recognized at the time when the image has been rubbed fewer than 100 strokes, and the decrease is a practically intolerable level.
D: Obvious decrease in the density of the image is recognized at the time when the image has been rubbed fewer than 30 strokes, and the decrease is a practically intolerable level.

Evaluation of Adhesion

Ten each of vertical and horizontal lines on the solid images formed on the PP film were cut with a 5 mm interval using a cutter. Thereafter, a piece of Scotch tape (manufactured by Sumitomo 3M Ltd.) was brought into close contact therewith and peeled off. The image after the Scotch tape was peeled off was visually observed and evaluated according to the following criteria.

A: No peeling occurs in the image film.
B: The edges of the cut lines are slightly lifted but are not peeled.
C: One or more sites in the image are peeled.
D: Ten or more sites in the image are peeled.

TABLE 1

| | | | Comparative Example 1 | Comparative Example 2 | Example 1 | Example 2 | Example 3 | Comparative Example 3 |
|---|---|---|---|---|---|---|---|---|
| Composition | Photocurable compound | NK ESTER A-400 | 18.45 | 15.45 | 13.45 | 10.45 | 5.45 | 2.45 |
| | | CD561 | | | 13 | 10 | | |
| | | SR499 | 20 | 16 | | | 6 | 3 |
| | | SR494 | 16 | 13 | 10 | 8 | 5 | 3 |
| | | Miramer M360 | 15 | 15 | 15 | 11 | 5 | 3 |
| | | Laromer PE9074 | 5 | 5 | 5 | | | |
| | | CN2270 | | | | 5 | 8 | 8 |
| | Gelling agent | KAO Wax T1 | 4 | 4 | 4 | 4 | 4 | 4 |
| | | FATTY AMIDE T | | | | | | |
| | | LUNAC BA | | | | | | |
| | Liquid compound | Anisole | | 10 | 18 | 30 | 45 | 55 |
| | Photopolymerization initiator | DAROCURE TPO | 5 | 5 | 5 | 5 | 5 | 5 |
| | | ITX | 2 | 2 | 2 | 2 | 2 | 2 |
| | Surfactant | KF-352 | 0.05 | 0.05 | 0.05 | 0.05 | 0.05 | 0.05 |
| | Sensitization promoter | KayacureEPA | 2 | 2 | 2 | 2 | 2 | 2 |
| | Pigment dispersion | | 12.5 | 12.5 | 12.5 | 12.5 | 12.5 | 12.5 |
| Image formation condition | Recording medium temperature | At time of IJ recording | 40 | 40 | 40 | 40 | 40 | 40 |
| | | Before UV irradiation | 40 | 40 | 40 | 40 | 40 | 40 |
| | | After UV irradiation | 40 | 40 | 40 | 40 | 40 | 60 |
| Evaluation results | Ability of ink discharge | | A | A | A | A | A | A |
| | Letter quality | | A | A | A | A | A | C |
| | Blank | | A | A | A | A | A | C |
| | Glossiness | | D | D | B | A | A | A |
| | Relief feeling | | D | C | B | B | A | A |
| | Bending resistance | | D | D | A | A | A | A |
| | Rub resistance | | A | A | A | A | A | D |
| | Adhesion | | D | C | A | A | A | D |

As seen from Table 1 above, the inks of Comparative Examples 1 and 2 containing no liquid compound or containing the liquid compound at a content smaller than 15 wt % relative to the total weight of the ink had satisfactory image quality (letter quality and blank) but had insufficient glossiness. Although the pinning properties of these inks landed on the recording medium were satisfactory, no glossiness was presumably obtained due to fine irregularities formed on the surface of the printed image. In addition, in Comparative Examples 1 and 2, level differences (relief feeling) were also generated at the boundary between the image-formed area and the non-image-formed area.

By contrast, the ink of Example 1 containing the liquid compound in an amount of 18 wt % relative to the total weight of the ink produced glossiness at a practically tolerable level and further offered a low relief feeling. The ink of Example 2 containing the liquid compound in an amount of 30 wt % relative to the total weight of the ink produced satisfactory glossiness, though a relief feeling was somewhat seen. The ink of Example 3 containing the liquid compound in an amount of 45 wt % relative to the total weight of the ink had satisfactory glossiness, and no level differences were seen between the image-formed area and the non-image-formed area. In Examples 1 to 3, presumably, the liquid compound in the ink penetrated into the recording medium or volatized, whereby the thickness of the printed image was decreased to alleviate irregularities on the surface of the image or level differences between the image-formed area and the non-image-formed area.

In the case where no liquid compound is contained or the content of the liquid compound is small (Comparative Examples 1 and 2), the adhesion between the recording medium and the printed image was low. In contrast to this, in the case where the liquid compound is contained at 15 wt % or larger and 50 wt % or smaller (Examples 1 to 3), the adhesion between the recording medium and the image was satisfactory. Presumably, ink components penetrated into the recording medium, together with the liquid compound, thereby improving adhesion.

However, when the amount of the liquid compound exceeded 50 wt %, the image quality (letter quality or blank) was degraded and the rub resistance or the adhesion was also degraded (Comparative Example 3). Because the liquid compound was contained in a large amount, the amount of the photocurable compound was decreased, presumably lowering the curability of the film.

Examples 4 to 6

Compounds were mixed according to the composition ratio described in Table 2, and stirred under heating at 100° C. Then, the obtained liquids were filtered through a #3000 metal mesh filter under heating. The resultant solutions were cooled to prepare cyan inks. Ability of ink discharge from the inkjet recording apparatus was evaluated as to the obtained cyan inks. In these examples, the cyan ink having the same composition was used, and images were formed by changing the temperature of the recording medium at the time of inkjet recording, the temperature of the recording medium from after the inkjet recording to before UV irradiation, and the temperature of the recording medium after the UV irradiation. The formed images were evaluated in the same manner as that described in Example 1, etc. The results are shown in Table 2. Table 2 also shows the results of Example 2 described above.

TABLE 2

| | | | Example 4 | Example 2 | Example 5 | Example 6 |
|---|---|---|---|---|---|---|
| Composition | Photocurable compound | NK ESTER A-400 | 10.45 | 10.45 | 10.45 | 10.45 |
| | | CD561 | 10 | 10 | 10 | 10 |
| | | SR499 | | | | |
| | | SR494 | 8 | 8 | 8 | 8 |
| | | Miramer M360 | 11 | 11 | 11 | 11 |
| | | Laromer PE9074 | | | | |
| | | CN2270 | 5 | 5 | 5 | 5 |
| | Gelling agent | KAO Wax T1 | 4 | 4 | 4 | 4 |
| | | FATTY AMIDE T | | | | |
| | | LUNAC BA | | | | |
| | Liquid compound | Anisole | 30 | 30 | 30 | 30 |
| | Photopolymerization initiator | DAROCURE TPO | 5 | 5 | 5 | 5 |
| | | ITX | 2 | 2 | 2 | 2 |
| | Surfactant | KF-352 | 0.05 | 0.05 | 0.05 | 0.05 |
| | Sensitization promoter | KayacureEPA | 2 | 2 | 2 | 2 |
| | Pigment dispersion | | 12.5 | 12.5 | 12.5 | 12.5 |
| Image formation condition | Recording medium temperature | At time of IJ recording | 25 | 40 | 40 | 40 |
| | | Before UV irradiation | 25 | 40 | 40 | 40 |
| | | After UV irradiation | 60 | 40 | 60 | 80 |
| Evaluation results | Ability of ink discharge | | A | A | A | A |
| | Letter quality | | A | A | A | A |
| | Blank | | A | A | A | A |
| | Glossiness | | B | A | A | A |
| | Relief feeling | | B | B | A | A |
| | Bending resistance | | A | A | A | A |
| | Rub resistance | | A | A | A | A |
| | Adhesion | | A | A | A | A |

As seen from Table 2 above, in the case where the temperature of the recording medium from after the landing of the ink to before UV irradiation was low (Example 4), the glossiness and the relief feeling were slightly low graded. Because the temperature of the recording medium from after the landing of the ink droplets to before UV irradiation was low, the pinning properties of the ink droplets were very high, presumably forming relatively large irregularities or level differences in the surface of the film.

On the other hand, in the case where the temperature of the recording medium after UV irradiation was relatively low (Example 2), the relief feeling was slightly low graded. This is presumably because the amount of the liquid compound volatizing was small so that the amount of decrease in the film thickness of the formed image was reduced.

In contrast to this, in the case where the recording medium was heated to some extent before the UV irradiation and further heated to a relatively high temperature after the UV irradiation (Examples 5 and 6), the glossiness or the relief feeling was evaluated as being very satisfactory.

Examples 7 to 15

Compounds were mixed according to the composition ratio described in Table 3, and stirred under heating at 100° C. Then, the obtained liquids were filtered through a #3000 metal mesh filter under heating. The resultant solutions were cooled to prepare cyan inks containing various liquid compounds. Ability of ink discharge from the inkjet recording apparatus was evaluated as to the obtained cyan inks. Also, images formed using these cyan inks were evaluated in the same manner as that described in Example 1, etc. The results are shown in Table 3. Table 3 also shows the results of Example 5 described above.

TABLE 3

|  |  |  | Boiling point (° C.) | CLogP value | Example 5 | Example 7 | Example 8 | Example 9 |
|---|---|---|---|---|---|---|---|---|
| Composition | Photocurable compound | NK ESTER A-400 |  | 0.47 | 10.45 | 10.45 | 10.45 | 10.45 |
|  |  | CD561 |  |  | 10 |  | 10 | 8 |
|  |  | SR499 |  | 3.57 |  | 8 |  |  |
|  |  | SR494 |  | 2.28 | 8 | 8 | 8 | 4 |
|  |  | Miramer M360 |  | 4.9 | 11 | 8 | 21 | 7 |
|  |  | Laromer PE9074 |  |  |  |  | 5 | 5 |
|  |  | CN2270 |  |  | 5 | 5 |  |  |
|  | Gelling agent | KAO Wax T1 |  |  | 4 | 4 |  | 4 |
|  |  | FATTY AMIDE T |  |  |  |  |  |  |
|  |  | LUNAC BA |  |  |  |  | 4 |  |
|  | Liquid compound | Anisole | 153 | 9.4 | 30 |  |  |  |
|  |  | Isophorone | 218 | 9.8 |  | 35 |  |  |
|  |  | Propylene glycol monomethyl ether | 121 | 10.19 |  |  | 20 |  |
|  |  | Propylene glycol n-propyl ether | 150 | 9.82 |  |  |  | 40 |
|  |  | Dipropylene glycol dimethyl ether | 175 | 7.88 |  |  |  |  |
|  |  | Dipropylene glycol methyl propyl ether | 203 | 7.99 |  |  |  |  |
|  |  | Ethyl acetate | 77 | 8.74 |  |  |  |  |
|  |  | Butyl acetate | 126 | 8.7 |  |  |  |  |
|  |  | Cyclohexanol acetate | 173 | 9.18 |  |  |  |  |
|  |  | Propylene glycol monomethyl ether acetate | 146 | 8.73 |  |  |  |  |
|  | Photopolymerization initiator | DAROCURE TPO |  |  | 5 | 5 | 5 | 5 |
|  |  | ITX |  |  | 2 | 2 | 2 | 2 |
|  | Surfactant | KF-352 |  |  | 0.05 | 0.05 | 0.05 | 0.05 |
|  | Sensitization promoter | KayacureEPA |  |  | 2 | 2 | 2 | 2 |
|  | Pigment dispersion |  |  |  | 12.5 | 12.5 | 12.5 | 12.5 |
| Image formation condition | Recording medium temperature | At time of IJ recording |  |  | 40 | 40 | 40 | 40 |
|  |  | Before UV irradiation |  |  | 40 | 40 | 40 | 40 |
|  |  | After UV irradiation |  |  | 60 | 80 | 40 | 40 |
| Evaluation results | Ability of ink discharge |  |  |  | A | A | B | A |
|  | Letter quality |  |  |  | A | A | B | A |
|  | Blank |  |  |  | A | A | A | A |
|  | Glossiness |  |  |  | A | B | A | A |
|  | Relief feeling |  |  |  | A | B | A | A |
|  | Bending resistance |  |  |  | A | A | A | A |
|  | Rub resistance |  |  |  | A | A | A | A |
|  | Adhesion |  |  |  | A | A | B | A |

|  |  |  | Example 10 | Example 11 | Example 12 | Example 13 | Example 14 | Example 15 |
|---|---|---|---|---|---|---|---|---|
| Composition | Photocurable compound | NK ESTER A-400 | 10.45 | 10.45 | 10.45 | 10.45 | 10.45 | 10.45 |
|  |  | CD561 | 10 |  |  |  |  |  |
|  |  | SR499 |  | 10 | 8 | 12 | 8 | 10 |
|  |  | SR494 | 8 | 8 | 8 | 11 | 4 | 8 |
|  |  | Miramer M360 | 21 | 11 | 8 | 11 | 7 | 11 |
|  |  | Laromer PE9074 |  | 5 |  |  |  |  |
|  |  | CN2270 | 5 |  | 5 | 5 | 5 | 5 |
|  | Gelling agent | KAO Wax T1 | 4 | 4 |  |  | 4 | 4 |
|  |  | FATTY AMIDE T |  |  | 4 | 4 |  |  |
|  |  | LUNAC BA |  |  |  |  |  |  |
|  | Liquid compound | Anisole |  |  |  |  |  |  |
|  |  | Isophorone |  |  |  |  |  |  |

TABLE 3-continued

|  |  |  |  |  |  |  |  |  |
|---|---|---|---|---|---|---|---|---|
|  |  | Propylene glycol monomethyl ether |  |  |  |  |  |  |
|  |  | Propylene glycol n-propyl ether |  |  |  |  |  |  |
|  |  | Dipropylene glycol dimethyl ether | 20 |  |  |  |  |  |
|  |  | Dipropylene glycol methyl propyl ether |  | 30 |  |  |  |  |
|  |  | Ethyl acetate |  |  | 35 |  |  |  |
|  |  | Butyl acetate |  |  |  | 25 |  |  |
|  |  | Cyclohexanol acetate |  |  |  |  | 40 |  |
|  |  | Propylene glycol monomethyl ether acetate |  |  |  |  |  | 30 |
|  | Photopolymerization initiator | DAROCURE TPO | 5 | 5 | 5 | 5 | 5 | 5 |
|  |  | ITX | 2 | 2 | 2 | 2 | 2 | 2 |
|  | Surfactant | KF-352 | 0.05 | 0.05 | 0.05 | 0.05 | 0.05 | 0.05 |
|  | Sensitization promoter | KayacureEPA | 2 | 2 | 2 | 2 | 2 | 2 |
|  | Pigment dispersion |  | 12.5 | 12.5 | 12.5 | 12.5 | 12.5 | 12.5 |
| Image formation condition | Recording medium temperature | At time of IJ recording | 40 | 40 | 40 | 40 | 40 | 40 |
|  |  | Before UV irradiation | 40 | 40 | 40 | 40 | 40 | 40 |
|  |  | After UV irradiation | 60 | 80 | 40 | 40 | 60 | 40 |
| Evaluation results | Ability of ink discharge |  | A | A | B | A | A | A |
|  | Letter quality |  | B | B | B | A | A | A |
|  | Blank |  | B | B | B | A | A | A |
|  | Glossiness |  | A | B | A | A | A | A |
|  | Relief feeling |  | A | B | A | A | A | A |
|  | Bending resistance |  | A | A | A | A | A | A |
|  | Rub resistance |  | A | A | A | A | A | A |
|  | Adhesion |  | A | A | A | A | A | A |

As seen from Table 3 above, in the case of using isophorone or dipropylene glycol methyl propyl ether having a boiling point exceeding 200° C. as the liquid compound (Examples 7 and 11), the glossiness and the relief feeling were slightly low graded. Because, the liquid compound having a high boiling point was added, it is difficult for the liquid compound to volatize from the printed image, presumably reducing the amount of decrease in film thickness.

On the other hand, in the case of using ethyl acetate having a boiling point lower than 120° C. as the liquid compound (Example 12) and in the case of using propylene glycol methyl ether having a boiling point around 120° C. as the liquid compound (Example 8), the ability of ink discharge was lowered and further the image quality (letter quality or blank) was slightly lowered. Because the liquid compound had a low boiling point, the discharge stability was presumably lowered due to the volatilization or the like of the liquid compound in the inkjet recording apparatus or near the nozzles.

In the case of using dipropylene glycol dimethyl ether or dipropylene glycol methyl propyl ether having an SP value of less than 8.5 as the liquid compound (Examples 10 and 11), the image quality (letter quality or blank) was slightly lowered. Presumably, sol-gel phase transition did not occur sufficiently due to high compatibility between the liquid compound and the gelling agent.

On the other hand, in the case of using propylene glycol methyl ether having an SP value of 10 or more as the liquid compound (Example 8), the adhesion between the ink and the recording medium was lowered. Because the liquid compound had a high SP value, presumably, the liquid compound had low affinity for the recording medium (PP film) and therefore had the difficulty in penetrating into the recording medium.

In contrast to this, in the case of adding the liquid compound having a boiling point from 120° C. or higher to 200° C. or lower and having an SP value of 8.5 or more (Examples 5, 9, and 13 to 15), the glossiness or the relief feeling was evaluated as being excellent and further the image quality was also satisfactory.

Examples 16 to 20 and Comparative Example 4

Compounds were mixed according to the composition ratio described in Table 4, and stirred under heating at 100° C. Then, the obtained liquids were filtered through a #3000 metal mesh filter under heating. The resultant solutions were cooled to prepare cyan inks. Ability of ink discharge from the inkjet recording apparatus was evaluated as to the obtained cyan inks. Also, images formed using these cyan inks were evaluated in the same manner as that described in Example 1. The results are shown in Table 4.

TABLE 4

|  |  |  | Boiling point (° C.) | SP value | Example 16 | Example 17 | Example 18 | Example 19 | Example 20 | Comparative Example 4 |
|---|---|---|---|---|---|---|---|---|---|---|
| Composition | Photocurable compound | NK ESTER A-400 |  |  | 10.45 | 10.45 | 10.45 | 10.45 | 10.45 | 10.45 |
|  |  | CD561 |  |  |  |  |  |  |  |  |
|  |  | SR499 |  |  | 10 | 10 | 12 | 7 | 7 | 10 |
|  |  | SR494 |  |  | 8 | 8 | 12 | 8 | 8 | 8 |
|  |  | Miramer M360 |  |  | 11 | 11 |  | 8 | 8 | 10 |

TABLE 4-continued

| | | Boiling point (° C.) | SP value | Example 16 | Example 17 | Example 18 | Example 19 | Example 20 | Comparative Example 4 |
|---|---|---|---|---|---|---|---|---|---|
| | Laromer PE9074 | | | 5 | 5 | 5 | 5 | 5 | 5 |
| | CN2270 | | | | | | | | |
| Gelling agent | KAO Wax T1 | | | 4 | 4 | 4 | | | |
| | FATTY AMIDE T | | | | | | 5 | | |
| | LUNAC BA | | | | | | | 5 | |
| Liquid compound | Anisole | 153 | 9.4 | 20 | 18 | 35 | 35 | 35 | 35 |
| | Propylene glycol n-propyl ether | 150 | 9.82 | 10 | | | | | |
| | Propylene glycol monomethyl ether acetate | 146 | 8.73 | | 12 | | | | |
| Photopolymerization initiator | DAROCURE TPO | | | 5 | 5 | 5 | 5 | 5 | 5 |
| | ITX | | | 2 | 2 | 2 | 2 | 2 | 2 |
| Surfactant | KF-352 | | | 0.05 | 0.05 | 0.05 | 0.05 | 0.05 | 0.05 |
| Sensitization promoter | KayacureEPA | | | 2 | 2 | 2 | 2 | 2 | 2 |
| | Pigment dispersion | | | 12.5 | 12.5 | 12.5 | 12.5 | 12.5 | 12.5 |
| Image formation condition | Recording medium temperature | At time of Ink discharge | | 40 | 40 | 40 | 40 | 40 | 25 |
| | | Before UV irradiation | | 40 | 40 | 40 | 40 | 40 | 25 |
| | | After UV irradiation | | 60 | 60 | 60 | 60 | 60 | 60 |
| Evaluation results | Ability of ink discharge | | | A | A | B | A | A | A |
| | Letter quality | | | A | A | A | A | A | D |
| | Blank | | | A | A | A | A | A | D |
| | Glossiness | | | A | A | A | A | A | A |
| | Relief feeling | | | A | A | A | A | A | A |
| | Bending resistance | | | A | A | B | A | A | D |
| | Rub resistance | | | A | A | A | A | A | D |
| | Adhesion | | | A | A | A | A | A | D |

As seen from Table 4 above, even in the case of using two or more types of liquid compounds in combination (Examples 16 and 17), the liquid compounds volatized or penetrated into the recording medium and thus the glossiness or the relief feeling was satisfactory.

In the case of using large amounts of the photocurable compounds having a C Log P value of lower than 4.0 (Example 18), the ability of ink discharge was lowered. This is presumably because only a few components were compatible with the gelling agent so that the gelling agent became unstable in the ink.

In the case of using stearic acid amide or behenic acid as the gelling agent (Examples 19 and 20), the inks supplemented with the liquid compound also had satisfactory glossiness and offered a low relief feeling. In addition, the image quality was also satisfactory.

By contrast, in the case of the ink containing no gelling agent (Comparative Example 4), its droplets were combined after landed on the recording medium, resulting in poor image quality. Moreover, this ink had low adhesion to the recording medium and was inferior in all of bending resistance, rub resistance, and adhesion.

The present application claims the priority based on prior Japanese patent applications filed by the same applicant, that is, Japanese Patent Application No. 2012-098811 (filing date of Apr. 24, 2012), and the content of those specifications are all incorporated herein by reference as a part of the present invention.

INDUSTRIAL APPLICABILITY

An image that is formed from the actinic radiation-curable inkjet ink according to one aspect of the present invention is excellent in glossiness and is less likely to produce level differences between the recording portion and the non-recording portion. Thus, the present invention is suitable for use in the preparation of various printed matters for which glossiness or smoothness is required.

REFERENCE SIGNS LIST 10, 20 Inkjet recording apparatus
12 Recording medium
14, 24 Inkjet recording head
16, 26 Head carriage
18, 28 Light irradiation section
19 Temperature control section
27 Guide section

The invention claimed is:

1. An actinic radiation-curable inkjet ink comprising a photocurable compound, a photopolymerization initiator, a gelling agent, and a liquid compound that is a liquid at 25° C. and is non-polymerizable, wherein
the photocurable compound comprises a (meth)acrylate compound having a CLogP value in a range from 4.0 to 7.0, and
the liquid compound is contained at from 15 wt % to 50 wt % relative to the weight of the ink;
wherein the liquid compound has an SP value of 8.5 or more and less than 10.0 and has a boiling point of 120° C. or higher and lower than 200° C.

2. The actinic radiation-curable inkjet ink according to claim 1, wherein the liquid compound is contained at from 25 wt % to 40 wt % relative to the weight of the ink.

3. The actinic radiation-curable inkjet ink according to claim 1, wherein the gelling agent is a compound selected from the group consisting of aliphatic ketone compounds, aliphatic ester compounds, petroleum waxes, plant-derived waxes, animal-derived waxes, mineral waxes, hydrogenated castor oil, hydrogenated castor oil derivatives, higher fatty acids, higher alcohols, hydroxystearic acids, fatty acid amides, esters of sucrose fatty acids, synthetic waxes, dimeric acids, dimer diols, fatty acid inulins, fatty acid dextrins, glyceryl behenate/eicosanedioate polyglyceryl behenate/eicosanedioate, amide compounds, dibenzylidene sorbitols, and low molecular weight oil gelling agents.

4. The actinic radiation-curable inkjet ink according to claim 1, wherein the gelling agent is a compound selected from the group consisting of aliphatic ketone compounds, aliphatic ester compounds, higher fatty acids, higher alcohols, and fatty acid amides, and the compound contains a straight-chain alkyl group having 12 or more carbon atoms.

5. The actinic radiation-curable inkjet ink according to claim 1, wherein the gelling agent is a compound selected from the group consisting of compounds represented by the following Formulas (G1) and (G2):

$$R1\text{-}CO\text{-}R2 \quad \text{Formula (G1):}$$

$$R3\text{-}COO\text{-}R4 \quad \text{Formula (G2):}$$

wherein R1 to R4 each independently represent an alkyl group having a straight-chain moiety having 12 or more carbon atoms, and R1 to R4 may also have a branched moiety.

6. The actinic radiation-curable inkjet ink according to claim 1, wherein the gelling agent is contained at from 0.5 wt % to 10 wt % relative to the weight of the ink.

7. The actinic radiation-curable inkjet ink according to claim 1, further comprising a polymerization inhibitor.

8. The actinic radiation-curable inkjet ink according to claim 1, further comprising a tertiary amine compound.

9. The actinic radiation-curable inkjet ink according to claim 1, wherein the (meth)acrylate compound having the C Log P value in the range from 4.0 to 7.0 has a molecular weight in a range from 300 to 1,500.

10. The actinic radiation-curable inkjet ink according to claim 1, wherein the (meth)acrylate compound having the C Log P value in the range from 4.0 to 7.0 is contained at from 5 wt % to 30 wt % relative to the weight of the ink.

11. The actinic radiation-curable inkjet ink according to claim 1, wherein the (meth)acrylate compound having the C Log P value in the range from 4.0 to 7.0 is a (meth)acrylate compound with a functionality of 3 or more and having 3 to 14 structures each of which is represented by ($-C(CH_3)H-CH_2-O-$), or a (meth)acrylate compound with a functionality of 2 or more and having a cyclic structure.

12. The actinic radiation-curable inkjet ink according to claim 1, further comprising a (meth)acrylate compound which has a molecular weight in a range from 300 to 1,500 and having 3 to 14 structures each of which is represented by ($-C(CH_3)H-CH_2-O-$).

13. The actinic radiation-curable inkjet ink according to claim 1, further comprising a dispersant and a pigment.

14. An image forming method comprising:
attaching ink droplets of the actinic radiation-curable inkjet ink according to claim 1 to a recording medium by discharging the ink droplets from an inkjet recording head; and
curing the droplets landed on the recording medium by irradiating the droplets with actinic radiation, wherein the recording medium is heated before the irradiation with actinic radiation and/or after the irradiation with actinic radiation.

15. The image forming method according to claim 14, wherein the recording medium is heated before the irradiation with actinic radiation and after the irradiation with actinic radiation, wherein
a temperature of the recording medium after the irradiation with actinic radiation is higher than that of the recording medium before the irradiation with actinic radiation.

16. The image forming method according to claim 14, wherein a temperature of the inkjet ink inside the inkjet recording head is set such that it is from 10 to 30° C. higher than a gelation temperature of the ink.

17. The image forming method according to claim 14, wherein a temperature of the recording medium is set to be from 30 to 80° C.

18. The image forming method according to claim 14, wherein a temperature of the recording medium is set such that it is from 10 to 20° C. lower than a gelation temperature of the ink.

19. The image forming method according to claim 14, wherein a time between after the ink droplets are landed on the recording medium and before the ink droplets are irradiated with the actinic radiation is within 10 seconds.

* * * * *